United States Patent [19]
Phillips et al.

[11] Patent Number: 6,114,018
[45] Date of Patent: *Sep. 5, 2000

[54] PAIRED OPTICALLY VARIABLE ARTICLE WITH PAIRED OPTICAL STRUCTURES AND INK, PAINT AND FOIL INCORPORATING THE SAME AND METHOD

[75] Inventors: Roger W. Phillips; Charles T. Markantes; Shari Powell Fisher, all of Santa Rosa; Robert G. Slusser, Healdsburg; Patrick K. Higgins, Windsor, all of Calif.; Anton F. Bleikolm, Ecublens, Switzerland

[73] Assignee: Flex Products, Inc., Santa Rosa, Calif.

[ * ] Notice: This patent is subject to a terminal disclaimer.

[21] Appl. No.: 08/957,852

[22] Filed: Oct. 27, 1997

Related U.S. Application Data

[63] Continuation of application No. 08/466,469, Jun. 6, 1995, Pat. No. 5,766,738.

[51] Int. Cl.[7] .............................. B32B 3/14; B32B 5/16; B32B 7/06; B32B 7/10
[52] U.S. Cl. .................. 428/200; 428/41.8; 428/42.1; 428/201; 428/202; 428/206; 428/207; 428/347; 428/352; 428/402; 428/915; 428/916
[58] Field of Search .................. 428/200, 41.8, 428/42.1, 201, 202, 206, 207, 347, 352, 402, 915, 916; 359/577, 580, 584, 586, 587, 589

[56] References Cited

U.S. PATENT DOCUMENTS

| | | | |
|---|---|---|---|
| 3,123,489 | 3/1964 | Bolomey et al. | 106/291 |
| 3,374,105 | 3/1968 | Bolomey | 106/291 |
| 3,858,977 | 1/1975 | Baird et al. | 356/71 |
| 4,168,986 | 9/1979 | Venis et al. | 106/291 |
| 4,534,398 | 8/1985 | Crane | 162/103 |
| 4,626,445 | 12/1986 | Dobrowolski et al. | 427/7 |
| 4,705,356 | 11/1987 | Berning et al. | 350/166 |
| 4,930,866 | 6/1990 | Berning et al. | 350/320 |
| 5,009,486 | 4/1991 | Dobrowolski et al. | 350/164 |
| 5,214,530 | 5/1993 | Coombs et al. | 359/359 |
| 5,248,544 | 9/1993 | Kaule | 428/195 |
| 5,766,738 | 6/1998 | Phillips et al. | 428/200 |

*Primary Examiner*—Vivian Chen
*Attorney, Agent, or Firm*—Flehr Hohbach Test Albritton & Herbert LLP

[57] ABSTRACT

An optically variable article comprising of a substrate and at least one non-overlapping pair of optically variable structures on the surface of the substrate, the optically variable structures having the same color at one angle of incidence and different colors at all other angles of incidence. The optically variable structures are formed from optically variable pigments, optically variable opaque foils, or optically variable multilayer thin film interference stacks.

30 Claims, 11 Drawing Sheets

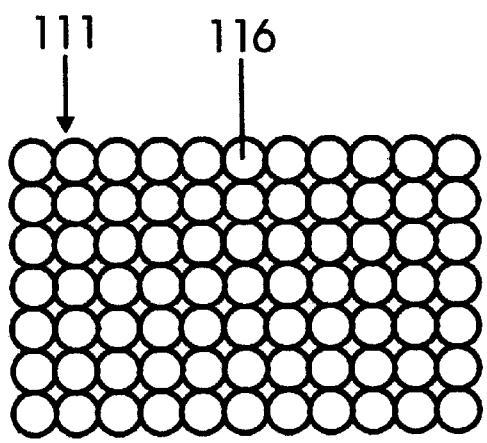
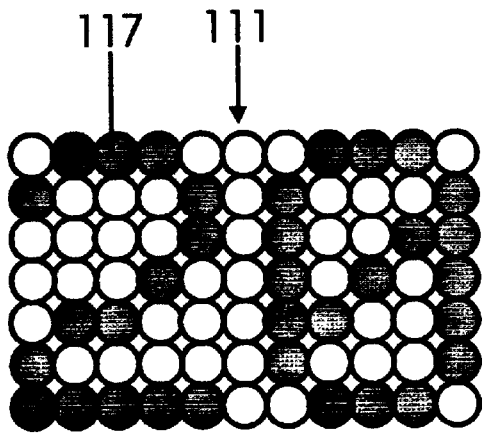
FIG 21　　　　　　　　　　FIG 22
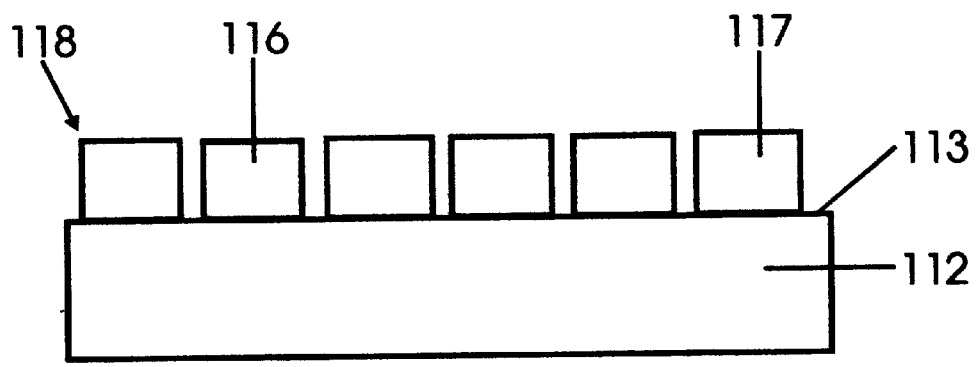
FIG 23

PAIRED OPTICALLY VARIABLE ARTICLE WITH PAIRED OPTICAL STRUCTURES AND INK, PAINT AND FOIL INCORPORATING THE SAME AND METHOD

This is a continuation of application Ser. No. 08/466,469 filed on Jun. 6, 1995, now U.S. Pat. No. 5,766,738.

BACKGROUND OF THE INVENTION

This invention relates to a paired optically variable article with paired optical structures and inks, paints and foils incorporating the same and a method.

Color from interference thin films is found in nature in fish scales, mother of pearl, etc. Naturally occurring mica, oil slicks and soap bubbles all display to some degree a level of iridescence. This iridescence or change in color as the viewing angle is changed, is a direct result of light reflecting from parallel interfaces from single or multilayer thin films. In general, the larger the refractive index difference across the interface(s) the greater the color effect. Color results from the interference of light. Maximum destructive reflective light interference occurs when the thickness of the layers are an odd number of quarter waves whereas maximum constructive light interference occurs when the thickness of the layers are an even number of quarter waves. Iridescent coatings which are called nacreous pigments when broken into small platelets are described in U.S. Pat. Nos. 3,087,828 and 3,123,490. These nacreous pigments are composed of single layer or multilayers in the optical thicknesses ranging from 10–100 nanometers typically prepared by vacuum deposition processes. These nacreous pigments are white or silvery and have very low color saturation regardless of the viewing orientation. Color is due mainly to simple Fresnel light reflection, scattering and/or absorption. Within many applications, it is desirable to achieve greater color saturation, i.e., chroma, than that can be achieved with nacreous pigments. In addition to chroma, there is a need for different colors and different color combinations which can be generated by using optically variable pigments. There is a particular need for such a multitude of colors for numerous anti-counterfeiting applications as well as other applications.

SUMMARY OF THE INVENTION

In general, it is an object of the present invention to provide a paired optically variable article and method utilizing paired optical structures to achieve different color combinations which can be utilized in inks, paints and foils.

Another object of the invention is to provide a paired optically variable article and method in which one interference optically variable device can be paired with a non-shifting device so that the non-shifting device matches the color of an interference optically variable device at a certain angle.

Another object of the invention is to provide a paired optically variable article in the form of optically variable foils and a method in which these optically variable foils can be made by placing optically variable flakes into a hot stamp polymer film carried by a release coat on a flexible substrate or by placing multilayer optically variable thin film coatings serving as optically variable specular foils carried by a release coat in a flexible substrate.

Another object of the invention is to provide a paired optically variable article and method in which the paired optical structures have the same color at one angle and have different colors at all other angles.

Another object of the invention is to provide a paired optical variable article and method of the above character in which the structures have high chroma.

Another object of the invention is to provide a paired article and method of the above character in which additives can be provided to achieve substantially identical colors of the paired structures at the one angle.

Another object of the invention is to provide a paired optical variable article and method of the above character which can be readily incorporated into printing inks.

Another object of the invention is to provide a paired optically variable article and method of the above character which can be readily incorporated into paints.

Another object of the invention is to provide a paired optically variable article and method of the above character which can be readily incorporated into foils.

Another object of the invention is to provide paired optical articles of the above character which can be incorporated in polymeric films, cast films and extruded and molded parts.

Another object of the invention is to provide paired optically variable articles of the above character that are not bleached by ultraviolet light.

Another object of the invention is to provide paired optically variable articles which can be paired with other paired optically variable articles.

Another object of the invention is to provide paired optical variable articles which can be utilized with non-shifting interference pigments.

Another object of the invention is to provide paired optically variable articles which can have symbols incorporated therein which only become visible at a predetermined angle.

Additional objects and features of the invention will appear from the following description as set forth in conjunction with the accompanying drawings.

BRIEF DESCRIPTION OF DRAWINGS

FIG. 21 is a plan view of a paired optically variable article incorporated into dot matrix foils with a symbol incorporated therein and having an angle of incidence in which the symbol is invisible.

FIG. 22 is a view similar to FIG. 21 with a different angle of incidence so that the symbol incorporated therein is visible.

FIG. 23 is a cross-sectional view taken along the line 23—23 of FIG. 22.

DETAILED DESCRIPTION OF THE INVENTION

In general, the optically variable article of the present invention is for use or viewing under incident light and is comprised of a substrate having first and second surfaces. First and second optical devices are carried by the first surface of the substrate in first and second spaced apart portions on the first surface to permit viewing at the same time by a human eye. A first optically variable structure is disposed in the first optical device and a second optical structure is disposed in the second device. The first and second optical devices have substantially the same color at one angle of incidence and colors different from each other at all other angles of incidence.

Figure 1:
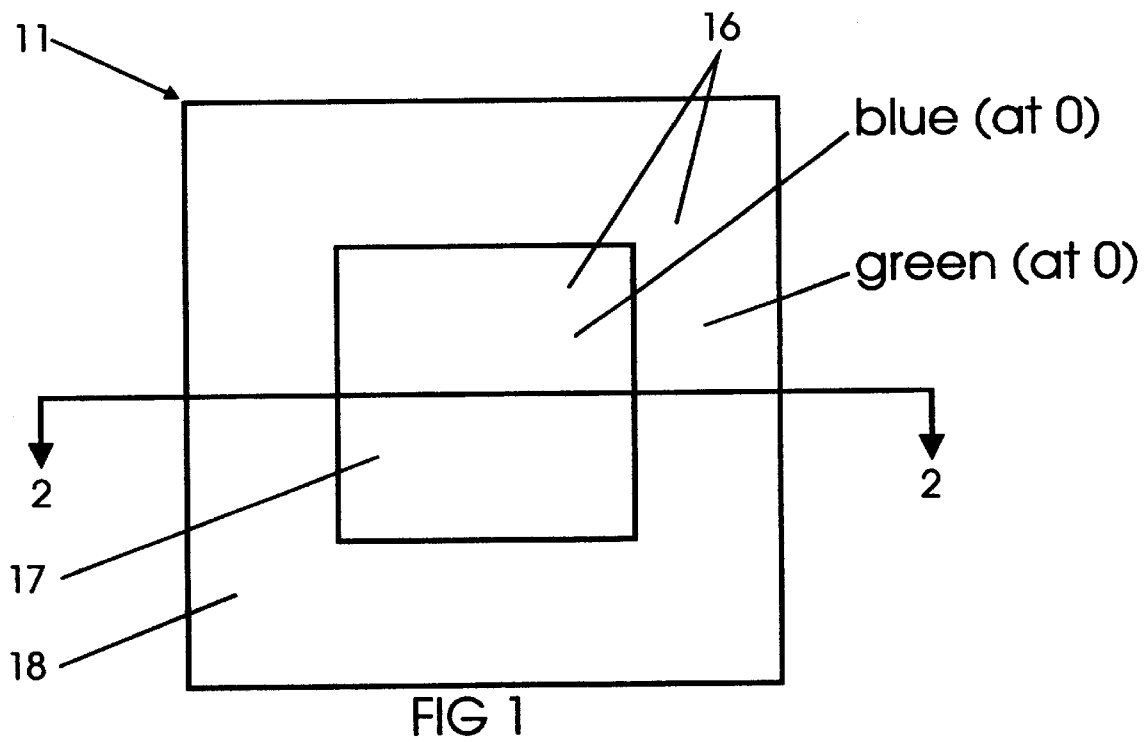
FIG. 1 is a plan view of a paired optically variable article incorporating paired optically variable pigments incorporating the present invention.
Figure 2:
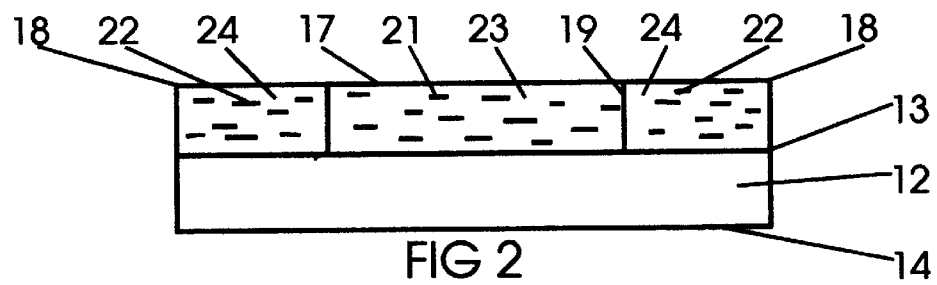
FIG. 2 is a cross-sectional view taken along the line 2—2 of FIG. 1.

More in particular as shown in FIG. 1 of the drawings, the optically variable article or device 11 consists of a substrate 12 provided with first and upper surface 13 and a second or lower surface 14 as shown in FIG. 2. The substrate 12 can be flexible or rigid and can be formed of any suitable material such as paper, plastic, cardboard, metal and the like. The substrate 12 can be opaque or transparent. Paired optically variable article or pigments 16 in a polymeric binder are disposed on one of the surfaces as for example on the first or top surface 13 as shown in FIG. 2 so that they are not superposed but are lying in spaces which are physically separated from each other on the plane of the surface 13. When the optically variable device is viewed the paired optically variable pigments 16 can be viewed simultaneously.

Thus as shown in FIG. 1, the article 11 has paired optically variable structures 16 provided in a first optically variable device or pattern 17 and also in a second optically variable device or pattern 18. The first and second patterns 17 and 18 do not overlap and are spaced apart but are disposed adjacent to each other and as shown in FIG. 2 in an abutting relationship. The first pattern 17 is in the form of a rectangle or square and is disposed within a recess 19 formed by the second pattern 18 also being in the form of a rectangle or square to form a border or frame that surrounds the first pattern 17.

The first optically variable article 17 or the first pattern 17 is provided with a first structure formed of optically variable flakes 21 constructed in the manner hereinbefore described to provide a first color shift with angle. The second optically variable article or second pattern 18 is provided with a second structure formed of optically variable flakes 22 also constructed in the manner hereinafter described and providing a second color shift with angle. As shown in FIG. 2, the structures 21 and 22 are disposed of in solidified liquid vehicles 23 and 24 respectively of a conventional type so that the optically variable devices 17 and 18 can have the desired characteristics. For example if an ink is the resulting product, a conventional ink vehicle is utilized whereas if a paint is the desired product, a paint vehicle of a suitable type is utilized.

In the first and second structures or flakes 21 and 22 utilized, it is important that the two structures have the same color at one angle of incidence of light and have different colors at all other angles of incidence of light. Thus by way of example, the structures 21 and 22 can be constructed so that at a 10° angle of incidence of light, the two structures have the same color but at any other higher angle of incidence the two optically variable structures 21 and 22 will have different colors which for example at 45° are markedly different. Conversely, the structures 21 and 22 could be constructed so that they have the same color at a different angle as for example an angle of 45° but have different colors at all other angles of incidence. However, it should be understood that other color matches can be found from 0°–90°. Thus by way of example article or with the device 11 shown in FIG. 1, the structures 21 and 22 at an angle of incidence of about 10° would have the same color or a matched color, as for example, green an another color, magenta at another angle of about 45° for the first device 17 and the color blue for the second device 18. Thus, it can be seen there is a dramatic color shift differential when shifting from 10° to 45° the angle of incidence of the paired optically variable device 11. In one embodiment of the invention as shown in FIG. 1, the inner first optically variable device (OVD) 17 had the following characteristics with respect to the outer or second optically variable device (OVD) 18.

| OUTER OVD 18 | | INNER OVD 17 | |
|---|---|---|---|
| L° | 54.91 | L° | 42.69 |
| a° | −32.45 | a° | 19.29 |
| b° | −11.48 | b° | −51.25 |

The a* and b* used above are used in connection with a recognized standard color space system. In the color space system, the colors are plotted in a plane of the CIELAB-system in which a* represents red and green and b* represents yellow and blue. The lightness of the color is on an axis at right angles to the plane going from black or L*=0 to white where L*=100. Thus the color would be grey in the center of the plane with the chroma increasing from the center toward the outer perimeter of the plane. The extreme edge of the plane defines the highest chroma. For example, a red light emitting laser would have high chroma. Between the center and edge, there are various gradations of the red as for example, a pink. Thus, there are planes of these colors which move up and down the L* axis or the lightness value axis. For every illuminant-observer combination of the tristimulus value, the color coordinates can be readily calculated and also can be measured. It is well known to those skilled in the art of color, that any pigment or any color can have a different appearance depending upon the illuminant. For example a color under fluorescent light may be quite different from the color under sunlight or under a tungsten lamp. In accordance with the present invention, it is important that the matched colors of the pigments 21 and 22 at a certain angle be compared under the same illuminant. Thus a pigment may be irradiated with a predetermined amount of energy across the wavelength to provide a graph of power versus wavelength. The quantity of light or energy impinging or striking the pigment at a given wavelength will influence the reflectance curve. The spectral power distribution from the light source is integrated with the eye response function typically designated as $\bar{x}$, $\bar{y}$ and $\bar{z}$ and the reflectance spectrum to yield the tristimulus values X, Y and Z.

In connection with the present invention, the L*, a*, b* (CIELAB) color space is used to describe the invention since this system is the most uniform (linear in color) known to date and is generally accepted worldwide for practical use. Thus, in the CIELAB color space, the color of any optically variable device can be characterized by the three tristimulus values, X, Y and Z. These tristimulus values take into account the spectral distribution of the light source, the reflectance of the optically variable pigment and the spectral sensitivity to the human eye. It is from these X, Y and Z values that the L*, a*, b* coordinates are calculated as are the related values of L* (lightness), C* (chroma), h (hue) and associated color differences i.e. delta L*, delta C* and delta h. The appropriate color formulae are listed below.

| | |
|---|---|
| L° = 116 (Y/Y$_n$)⅓ − 16 | Formula 1 |
| a° = 500 [(X/X$_n$)⅓ − (Y/Y$_n$)⅓] | Formula 2 |
| b° = 200 [(Y/Y$_n$)⅓ − (Z/Z$_n$)⅓] | Formula 3 |
| C° = (a*² + b*²)½ | Formula 4 |
| h = arctan (b°/a°) | Formula 5 |

Where $X_n$, $Y_n$, or $Z_n$ are tristimulus values for an ideal white diffuser and the illuminant-observer combination.

The designs for the paired optically variable structures are selected so that in the a* b* diagrams of the same there are crossover points at which the optically variable pigments will have the same hue and chroma. The manner in which these colors of the optically variable pigments change with angle is dependent upon the ambient lighting conditions. Thus in connection with the present invention, three different types of illumination are considered. Illuminant A represents illumination from an incandescent (tungsten) light at a temperature of 2856° Kelvin. Illuminant C represents average sunlight with a correlated color temperature of 6770° Kelvin and Illuminant F represents light from a cool white fluorescent source at a correlated color temperature of 4200° Kelvin. These three illuminants have been chosen because they represent the most common forms of illumination for both interior and exterior lighting conditions.

In Tables I to VI below and in the drawings in FIGS. 3–6 there are shown representative samples of designs which are possible under illuminant A. Thus for example in Table I, there are shown ten examples of paired optically variable structures. Selecting Example 1 in Table I, Design 1 has a thin film interference stack of two quarter waves at the 620 nanometers and for Design 2 four quarter waves at 587 nanometers. For Design 1 and Design 2 in this example, the color is almost the same at 10° viewing orientation.

TABLE I

PAIRED OPTICALLY VARIABLE STRUCTURES
ILLUMINANT A AT 10°

| Example | Design 1 | | Design 2 |
|---|---|---|---|
| 1) | 2 qw @ 620 nm | and | 4 qw @ 587 nm |
| 2) | 2 qw @ 691 nm | " | 4 qw @ 593 nm |
| 3) | 3 qw @ 697 nm | " | 5 qw @ 649 nm |
| 4) | 2 qw @ 510 nm | " | 5 qw @ 671 nm |
| 5) | 2 qw @ 478 nm | " | 6 qw @ 674 nm |
| 6) | 3 qw @ 498 nm | " | 6 qw @ 589 nm |
| 7) | 3 qw @ 653 nm | " | 5 qw @ 595 nm |
| 8) | 3 qw @ 506 nm | " | 6 qw @ 642 nm |
| 9) | 2 qw @ 420 nm | " | 5 qw @ 577 nm |
| 10) | 3 qw @ 534 nm | " | 4 qw @ 688 nm |

Table II set forth below shows the calculated color values of L*, a*, b*, h and C* for each pair in the Example 1–10 consisting of Design 1 and Design 2. Example 1 at 10°, of the pair of optically variable structures has an L* value of 77.85 and Design 2 has an L* value of 79.76. With the angle shifted to 45°, Design 1 has an L* value of 91.89 and Design 2 has an L* value of 76.77. In addition, Table II shows the calculated color parameters for the designs shown in Table I.

TABLE II

COLOR VALUES FOR EXAMPLES IN TABLE I

| Example | L* | a* | b* | h | C* | Delta h |
|---|---|---|---|---|---|---|
| 1) a, 10 deg. | 77.85 | 29.7 | 62.92 | 64.73 | 69.58 | |
| a, 45 deg. | 91.89 | −1.91 | 39.76 | 92.75 | 39.81 | |
| b, 10 deg. | 79.76 | 29.84 | 63.08 | 64.68 | 69.78 | 0.05 |
| b, 45 deg. | 76.77 | −62.02 | 18.75 | 163.18 | 64.79 | |
| 2) a, 10 deg. | 58.53 | 36.17 | 53.01 | 55.69 | 64.17 | |
| a, 45 deg. | 83.1 | 23.44 | 55.06 | 66.94 | 59.84 | |
| b, 10 deg. | 78.03 | 35.82 | 53.9 | 56.39 | 64.72 | −0.7 |
| b, 45 deg. | 78.58 | −58.41 | 26.6 | 155.51 | 64.18 | |
| 3) a, 10 deg. | 81.33 | −52.1 | 43.3 | 140.27 | 67.74 | |
| a, 45 deg. | 49.72 | −30.43 | −66.53 | 245.42 | 73.16 | |
| b, 10 deg. | 75.85 | −52.49 | 44.06 | 139.99 | 68.53 | 0.28 |
| b, 45 deg. | 48.94 | 9.95 | −53.89 | 280.46 | 54.8 | |
| 4) a, 10 deg. | 92.04 | −15.83 | 27.36 | 120.05 | 31.61 | |
| a, 45 deg. | 78.01 | −30.76 | −24.94 | 219.04 | 39.6 | |

TABLE II-continued

COLOR VALUES FOR EXAMPLES IN TABLE I

| Example | L* | a* | b* | h | C* | Delta h |
|---|---|---|---|---|---|---|
| b, 10 deg. | 77.84 | −15.65 | 27.6 | 119.56 | 31.72 | 0.49 |
| b, 45 deg. | 53.19 | −35.35 | −33.02 | 223.05 | 48.37 | |
| 5) a, 10 deg. | 87.69 | −28.3 | 4 | 171.96 | 28.58 | |
| a, 45 deg. | 68.76 | −25.8 | −43.28 | 239.2 | 50.39 | |
| b, 10 deg. | 58.53 | −29.83 | 4.4 | 171.61 | 30.15 | 0.35 |
| b, 45 deg. | 75.5 | 27.99 | −0.05 | 359.91 | 27.99 | |
| 6) a, 10 deg. | 44.24 | 37.16 | −4.47 | 353.15 | 37.43 | |
| a, 45 deg. | 71.36 | 31.84 | 56.4 | 60.55 | 64.77 | |
| b, 10 deg. | 73.84 | 37.62 | −5.69 | 351.39 | 38.05 | 1.76 |
| b, 45 deg. | 65.35 | −78.45 | 15.06 | 169.13 | 79.88 | |
| 7) a, 10 deg. | 68.32 | −71.62 | −11.06 | 188.78 | 72.46 | |
| a, 45 deg. | 39.55 | 13.83 | −79.77 | 279.84 | 80.96 | |
| b, 10 deg. | 57.19 | −71.73 | −11.56 | 189.16 | 72.66 | −0.38 |
| b, 45 deg. | 60.07 | 57.93 | −31.07 | 331.79 | 65.73 | |
| 8) a, 10 deg. | 41.61 | 37.4 | −19.15 | 332.89 | 42.02 | |
| a, 45 deg. | 68.68 | 32.58 | 55.37 | 59.53 | 64.24 | |
| b, 10 deg. | 57.74 | 38.71 | −18.47 | 334.49 | 42.89 | −1.6 |
| b, 45 deg. | 77.91 | −21.93 | 29.77 | 126.39 | 36.97 | |
| 9) a, 10 deg. | 70.53 | −28.52 | 41.34 | 235.4 | 50.22 | |
| a, 45 deg. | 51.31 | −12.96 | −53.61 | 256.41 | 55.15 | |
| b, 10 deg. | 49.98 | −30.65 | 40.7 | 233.02 | 50.95 | 2.38 |
| b, 45 deg. | 67.43 | 54.11 | −2.19 | 357.68 | 54.15 | |
| 10) a, 10 deg. | 35.03 | 35.58 | −63.93 | 299.1 | 73.16 | |
| a, 45 deg. | 59.41 | 33.45 | 43.83 | 52.65 | 55.13 | |
| b, 10 deg. | 46.5 | 34.99 | −63.1 | 299.01 | 72.15 | 0.09 |
| b, 45 deg. | 77.49 | 36.42 | 46.37 | 51.85 | 58.96 | |

The color difference at 10° viewing angle as well as that for a 45° viewing angle for each example is set forth below in Table III. The total color difference delta E (ΔE) between the colors of the paired optically variable pigments are calculated from L*, a*, and b* using Formula 6:

$$\Delta E^* = [(\Delta L^*)^2 + (\Delta a^*)^2 + (\Delta b^*)^2]^{1/2} \qquad \text{Formula 6}$$

TABLE III

TOTAL COLOR DIFFERENCE (DELTA E) FOR EXAMPLES IN TABLE I
Pair Total Color Difference (Delta E)

| Des. Pair Example | 10 Deg. | 45 Deg. |
|---|---|---|
| 1 | 1.92 | 65.45 |
| 2 | 19.52 | 86.77 |
| 3 | 5.55 | 42.32 |
| 4 | 14.20 | 26.50 |
| 5 | 29.20 | 69.34 |
| 6 | 29.63 | 117.94 |
| 7 | 11.14 | 68.83 |
| 8 | 16.20 | 60.93 |
| 9 | 20.67 | 86.04 |
| 10 | 11.52 | 18.50 |

Design pairs are from the 10 degree designs.
Note: The 45° data shows the color difference at 45° for the 10 degree color pairs.

Thus the lower the ΔE value, the closer the colors match. ΔE includes not only hue and color saturation but the brightness of the paired optically variable pigments as well.

Figure 3:
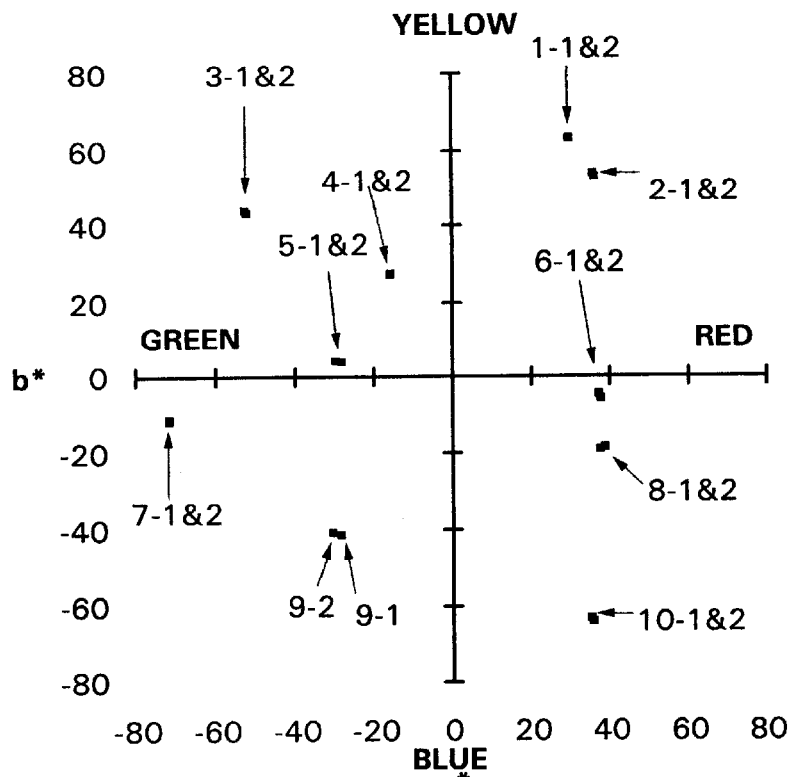
FIG. 3 is a graphical representation of the examples shown in Tables I, II and III and showing the matching of colors of paired designs at 10° under Illuminant A.
Figure 4:
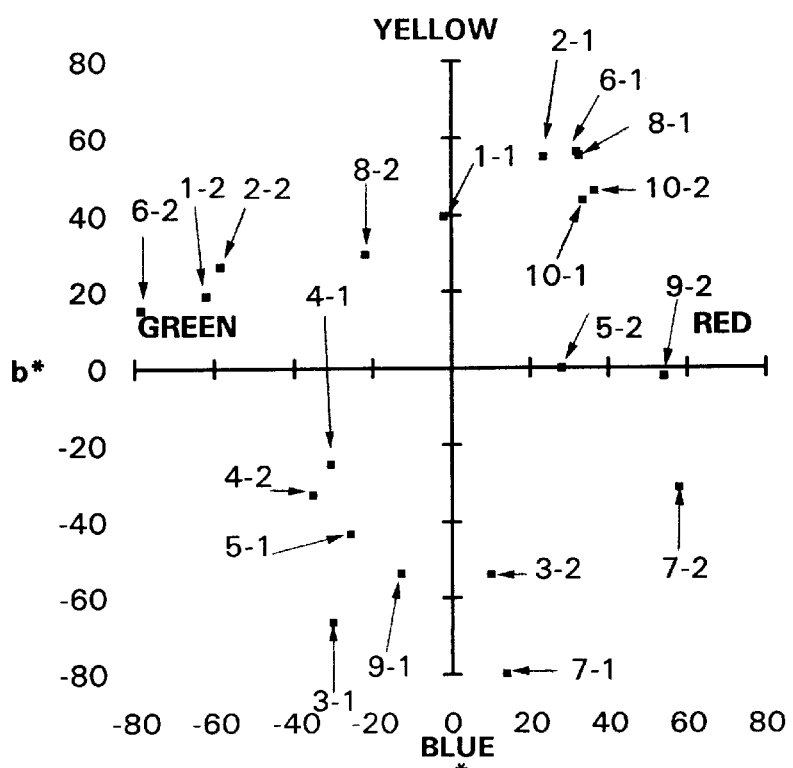
FIG. 4 is a graphical representation similar to that shown in FIG. 3 but showing the divergence of colors of paired designs at 45° under Illuminant A.

FIGS. 3 and 4 of the drawings are graphical representations of what has been presented in Tables I, II, and III. FIG. 3 shows how closely the colors are matched in hue and chroma for the examples of the paired designs of the paired optically variable structures in the a*b* color space. From FIG. 3 it can be seen that the pairs are of almost identical colors at the 10° orientation. However, when the pairs are tilted to 45° the two designs of each color pair and each of the examples have widely different color properties which is what is desired in accordance with the present invention.

Thus there have been provided ten examples of paired optically variable structures. Each have essentially no hue and chroma difference at 10° but at 45° have widely divergent hue and chroma contrasts. In the graphs in FIG. 3 and 4, the paired designs are identified in accordance with Tables I, II and III. Thus Example 1 with design 1 is labeled "1-1" and Example 1 with design 2 is labeled "1-2".

In Tables IV, V and VI below there are set forth eight examples of paired designs for paired optically variable structures in accordance with the present invention in which the converse of that obtained in the ten examples in Tables I, II and III has been given in which color differences are minimized at 45° and color changes occur at a shifted angle, as for example at 10°.

TADLE IV

PAIRED OPTICALLY VARIABLE STRUCTURES ILLUMINANT "A" AT 45°

| Example | Design 1 | | Design 2 |
|---|---|---|---|
| 1) | 3 qw @ 480 nm | and | 4 qw @ 679 nm |
| 2) | 3 qw @ 520 nm | " | 4 qw @ 684 nm |
| 3) | 4 qw @ 604 nm | " | 6 qw @ 625 nm |
| 4) | 2 qw @ 589 nm | " | 6 qw @ 646 nm |
| 5) | 3 qw @ 576 nm | " | 6 qw @ 678 nm |
| 6) | 4 qw @ 568 nm | " | 5 qw @ 690 nm |
| 7) | 2 qw @ 491 nm | " | 5 0qw @ 668 nm |
| 8) | 3 qw @ 618 nm | " | 5 qw @ 637 nm |

TABLE V

COLOR VALUES FOR EXAMPLES IN TABLE IV

| Example | L* | a* | b* | h | C* | Delta h[1] |
|---|---|---|---|---|---|---|
| 1) a, 10 deg. | 50.82 | 36.66 | 27.48 | 36.85 | 45.82 | |
| a, 45 deg. | 77.26 | 28.97 | 56.77 | 62.96 | 63.73 | |
| b, 10 deg. | 47.7 | 46.3 | −62.59 | 306.49 | 77.85 | |
| b, 45 deg. | 79.69 | 29.26 | 57.38 | 62.98 | 64.41 | −0.02 |
| 2) a, 10 deg. | 37.69 | 37.4 | −43.45 | 310.72 | 57.33 | |
| a, 45 deg. | 64 | 33.27 | 51.52 | 57.14 | 61.33 | |
| b, 10 deg. | 46.92 | 40.45 | −63.25 | 302.6 | 75.07 | |
| b, 45 deg. | 78.5 | 33.36 | 51.52 | 57.08 | 61.37 | 0.06 |
| 3) a, 10 deg. | 74.39 | 45.24 | 34.56 | 37.38 | 56.93 | |
| a, 45 deg. | 81.34 | −49.76 | 40.03 | 141.19 | 63.86 | |
| b, 10 deg. | 62.14 | 55.64 | −23.07 | 337.48 | 60.24 | |
| b, 45 deg. | 76.13 | −49.57 | 40.76 | 140.57 | 64.11 | 0.62 |
| 4) a, 10 deg. | 85.13 | 21.38 | 58.48 | 69.91 | 62.27 | |
| a, 45 deg. | 91.67 | −15.3 | 25.98 | 120.49 | 30.15 | |
| b, 10 deg. | 57.13 | 32.12 | −16.24 | 333.18 | 35.99 | |
| b, 45 deg. | 78.01 | −15.16 | 26.14 | 120.11 | 30.22 | 0.38 |
| 5) a, 10 deg. | 38.07 | 2.39 | −86.75 | 271.58 | 86.78 | |
| a, 45 deg. | 46.99 | 33.03 | −4.13 | 352.87 | 33.29 | |
| b, 10 deg. | 59.37 | −38.13 | 6.59 | 170.2 | 38.7 | |
| b, 45 deg. | 74.75 | 32.92 | −3.34 | 354.2 | 33.09 | −1.33 |
| 6) a, 10 deg. | 83.74 | 7.45 | 79.7 | 84.66 | 80.04 | |
| a, 45 deg. | 69.8 | −66.9 | −7.77 | 186.62 | 67.35 | |
| b, 10 deg. | 76.72 | 15.34 | 8.92 | 30.18 | 17.74 | |
| b, 45 deg. | 59.47 | −66.82 | −7.71 | 186.59 | 67.26 | 0.03 |
| 7) a, 10 deg. | 89.99 | −24.07 | 14.12 | 149.61 | 27.9 | |
| a, 45 deg. | 72.65 | −28.4 | −36.59 | 232.19 | 46.31 | |
| b, 10 deg. | 77.78 | −20.8 | 30.47 | 124.32 | 36.89 | |
| b, 45 deg. | 52.36 | −29.21 | −36.58 | 231.39 | 46.81 | 0.8 |
| 8) a, 10 deg. | 53.77 | −52.94 | −55.48 | 226.34 | 76.69 | |
| a, 45 deg. | 39.14 | 30.35 | −58.22 | 297.53 | 65.65 | |
| b, 10 deg. | 73.21 | −69.53 | 44.19 | 147.56 | 82.38 | |
| b, 45 deg. | 48.88 | 30.35 | −58.63 | 297.37 | 66.02 | 0.16 |

[1]Delta h is calculated between the "a" and "b" pair at 45° incidence.

TABLE VI

TOTAL COLOR DIFFERENCE (DELTA E) FOR EXAMPLES IN TABLE IV

| Des. Pair | ΔE 10 Deg. | ΔE 45 Deg. |
|---|---|---|
| 1 | 90.64 | 2. 52 |
| 2 | 22.06 | 14.50 |
| 3 | 59.83 | 5.26 |
| 4 | 80.51 | 13.66 |
| 5 | 103.96 | 27.77 |
| 6 | 71.56 | 10.33 |
| 7 | 20.67 | 20.31 |
| 8 | 102.89 | 9.75 |

Design pairs are from the 45 degree designs.
Note: The 10° data shows color difference for the 45 degree pairs at 10°.

Figure 5:
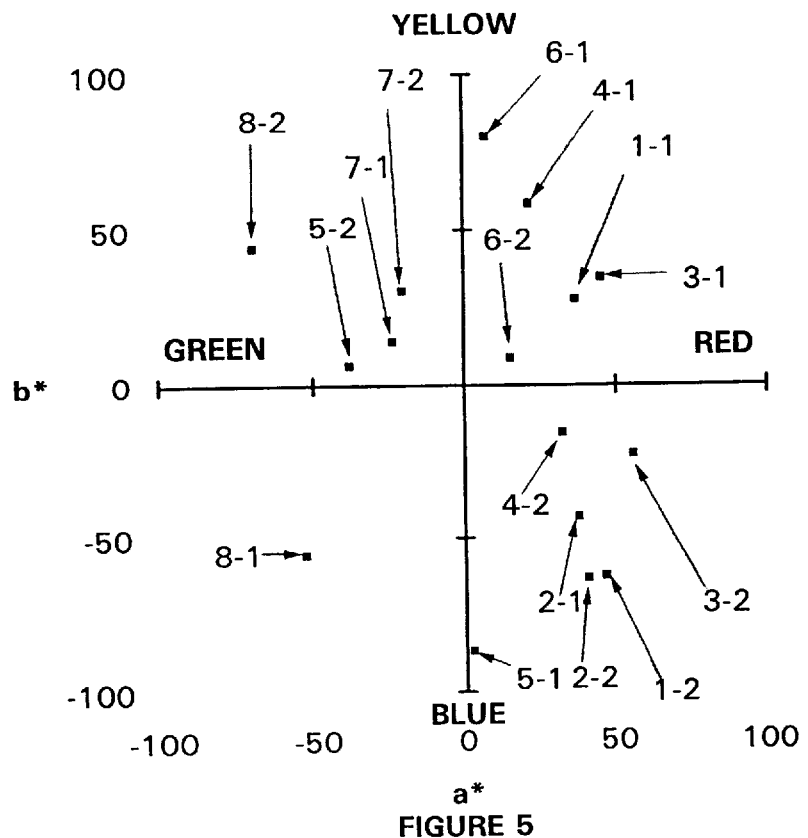
FIG. 5 is a graphical representation of the examples shown in Tables IV, V and VI showing the divergence of colors at 10° under Illuminant A.
Figure 6:
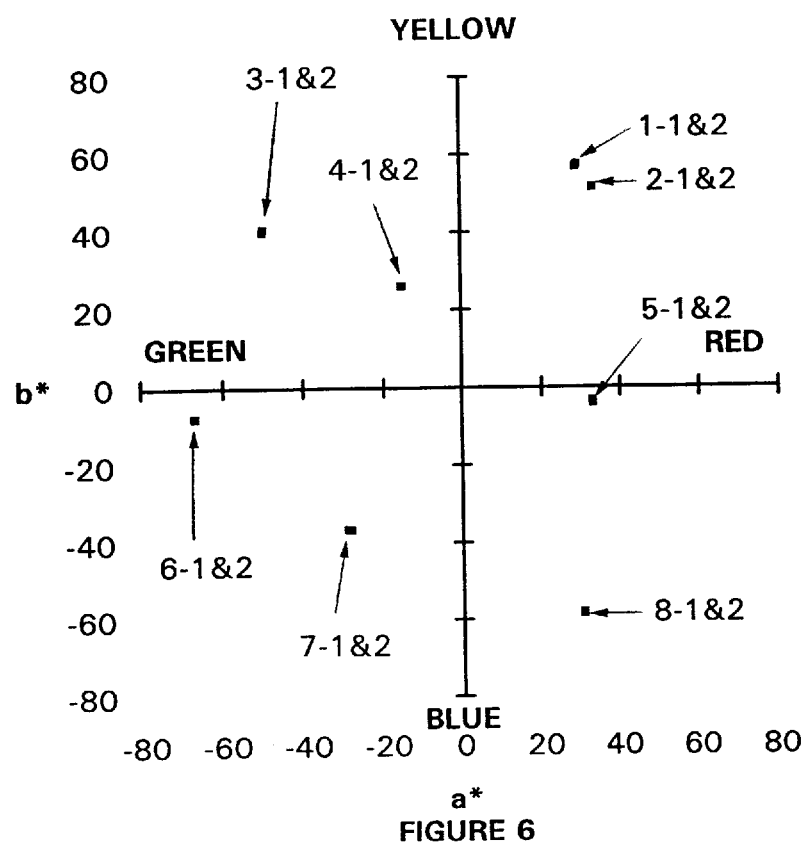
FIG. 6 is a graphical representation of the examples in Tables IV, V and VI at 45° showing the matching of colors of paired designs under Illuminant A.

Graphical representations of the data shown in Tables IV, V and VI are shown in FIGS. 5 and 6 of the drawings in which FIG. 5 shows the color divergence at the 10° with illuminant A and FIG. 6 shows no color divergence at an angle of 45° with illuminant A.

Figure 7:
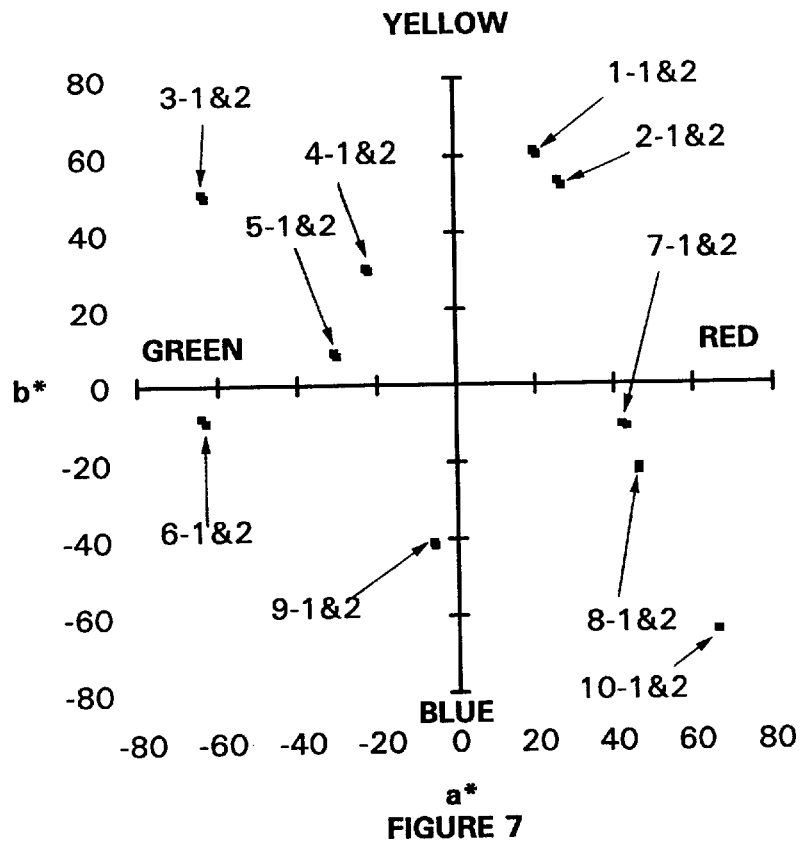
FIG. 7 is a graphical representation of the examples shown in Tables VII, VIII and IX showing the matching of colors of paired designs at 10° under Illuminant C.
Figure 8:
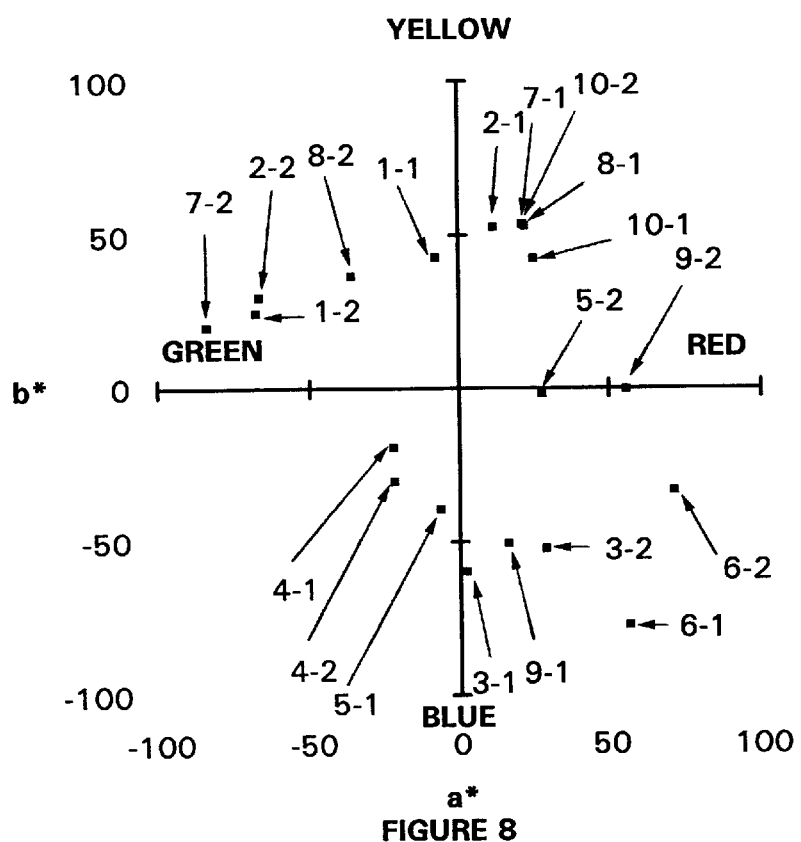
FIG. 8 is a graphical representation of the examples shown in Tables VII through IX showing divergence of colors of paired designs at 45° under Illuminant C.

Tables VII, VIII and IX below have the same data as Tables I, II and III except for illuminant C and with FIGS. 7 and 8 giving graphical representations showing the matching of colors at 10° and a divergence of the colors at 45°.

TABLE VII

PAIRED OPTICALLY VARIABLE STRUCTURES ILLUMINANT "C" AT 10°

| Example | Design 1 | | Design 2 |
|---|---|---|---|
| 1) | 2 qw @ 625 nm | and | 4 qw @ 582 nm |
| 2) | 2 qw @ 683 nm | " | 4 qw @ 586 nm |
| 3) | 3 qw @ 692 nm | " | 5 qw @ 641 nm |
| 4) | 2 qw @ 509 nm | " | 5 qw @ 662 nm |
| 5) | 2 qw @ 475 nm | " | 6 qw @ 663 nm |
| 6) | 3 qw @ 644 nm | " | 5 qw @ 586 nm |
| 7) | 3 qw @ 495 nm | " | 5 qw @ 698 nm |
| 8) | 3 qw @ 501 nm | " | 6 qw @ 630 nm |
| 9) | 2 qw @ 410 nm | " | 5 qw @ 567 nm |
| 10) | 3 qw @ 528 nm | " | 4 qw @ 674 nm |

TABLE VIII

COLOR VALUES FOR EXAMPLES IN TABLE IV

| Example | L* | a* | b* | h | C* | Delta E |
|---|---|---|---|---|---|---|
| 1) a, 10 deg. | 72.64 | 20.06 | 61.26 | 71.87 | 64.46 | |
| a, 45 deg. | 90.38 | −7.77 | 42.78 | 100.29 | 43.48 | |
| b, 10 deg. | 76.96 | 20.89 | 60.38 | 70.91 | 63.9 | 0.96 |
| b, 45 deg. | 78.94 | −67.69 | 24.79 | 159.88 | 72.08 | |
| 2) a, 10 deg. | 56.51 | 27.2 | 52.22 | 62.49 | 58.88 | |
| a, 45 deg. | 81.46 | 11.68 | 52.49 | 77.45 | 53.78 | |
| b, 10 deg. | 75.65 | 26.22 | 53.5 | 63.89 | 59.58 | −1.4 |
| b, 45 deg. | 79.98 | −66.71 | 29.87 | 155.88 | 73.09 | |
| 3) a, 10 deg. | 82.81 | −62.64 | 49.66 | 141.59 | 79.94 | |
| a, 45 deg. | 54.05 | 2.14 | −59.72 | 272.05 | 59.76 | |
| b, 10 deg. | 76.65 | −63.43 | 50.66 | 141.39 | 81.18 | 0.2 |
| b, 45 deg. | 50.87 | 28.79 | −52.27 | 298.85 | 59.67 | |
| 4) a, 10 deg. | 92.3 | −22.4 | 30.75 | 126.07 | 38.05 | |
| a, 45 deg. | 80.93 | −22.21 | −19.14 | 220.75 | 29.32 | |
| b, 10 deg. | 77.62 | −21.83 | 30.05 | 126 | 37.14 | 0.07 |
| b, 45 deg. | 55.54 | −22.03 | −30.15 | 233.85 | 37.34 | |
| 5) a, 10 deg. | 89.1 | −29.92 | 7.74 | 165.49 | 30.9 | |
| a, 45 deg. | 71.49 | −6.53 | −39.38 | 260.58 | 39.92 | |
| b, 10 deg. | 59.27 | −30.64 | 8.59 | 164.34 | 31.82 | 1.15 |
| b, 45 deg. | 74.52 | 27.69 | −1.75 | 356.39 | 27.75 | |

TABLE VIII-continued

COLOR VALUES FOR EXAMPLES IN TABLE IV

| Example | L* | a* | b* | h | C* | Delta E |
|---|---|---|---|---|---|---|
| 6) a, 10 deg. | 70.39 | −64.05 | −8.22 | 187.31 | 64.58 | |
| a, 45 deg. | 41.49 | 56.48 | −77.43 | 306.1 | 95.83 | |
| b, 10 deg. | 59.12 | −62.93 | −9.48 | 188.57 | 63.64 | −1.26 |
| b, 45 deg. | 58.86 | 71.26 | −33.23 | 335 | 78.63 | |
| 7) a, 10 deg. | 41.84 | 41.97 | −10.45 | 346.02 | 43.25 | |
| a, 45 deg. | 68.52 | 21.46 | 53.63 | 68.2 | 57.77 | |
| b, 10 deg. | 72.02 | 43.2 | −11.02 | 345.69 | 44.59 | 0.33 |
| b, 45 deg. | 67.3 | −83.81 | 20.31 | 166.38 | 86.24 | |
| 8) a, 10 deg. | 40.08 | 46.15 | −21.57 | 334.95 | 50.95 | |
| a, 45 deg. | 66.48 | 22.23 | 52.91 | 67.21 | 57.39 | |
| b, 10 deg. | 58.15 | 46.02 | −22.39 | 334.05 | 51.17 | 0.9 |
| b, 45 deg. | 77.88 | −35.97 | 36.76 | 134.38 | 51.43 | |
| 9) a, 10 deg. | 70.7 | −5.86 | 41.68 | 261.99 | 42.09 | |
| a, 45 deg. | 51.51 | 16.22 | −50.64 | 287.76 | 53.18 | |
| b, 10 deg. | 51.82 | −6.18 | 41.64 | 261.44 | 41.51 | 0.55 |
| b, 45 deg. | 66.24 | 55.65 | 0.31 | 359.68 | 55.65 | |
| 10) a, 10 deg. | 35.28 | 65.89 | −64.15 | 315.77 | 91.96 | |
| a, 45 deg. | 57.52 | 25.14 | 42.43 | 59.35 | 49.32 | |
| b, 10 deg. | 47.88 | 66.02 | −64.13 | 315.83 | 92.04 | −0.06 |
| b, 45 deg. | 76.79 | 21.61 | 53.51 | 68.01 | 57.71 | |

TABLE IX

Pair Total Color Difference (Delta E) For Examples in Table VII

| Des. Pair | ΔE 10 Deg. | ΔE 45 Deg. |
|---|---|---|
| 1 | 4.49 | 63.60 |
| 2 | 19.21 | 81.60 |
| 3 | 6.29 | 27.85 |
| 4 | 14.71 | 27.67 |
| 5 | 29.85 | 50.95 |
| 6 | 11.40 | 49.74 |
| 7 | 30.21 | 110.42 |
| 8 | 18.09 | 61.47 |
| 9 | 18.89 | 65.61 |
| 10 | 12.60 | 22.51 |

Design pairs are from the 10° designs.
Note: The 45° data shows color difference at 45° for the 10° color pairs.

Figure 9:
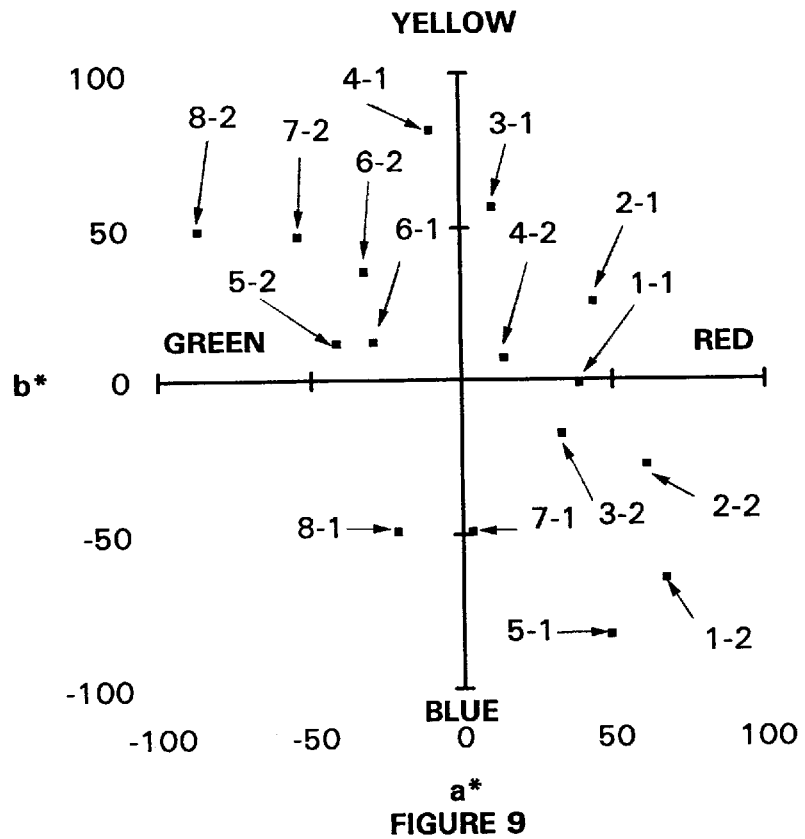
FIG. 9 is a graphical representation of the examples shown in Tables X, XI and XII showing divergence of colors of paired designs at 10° under Illuminant C.
Figure 10:
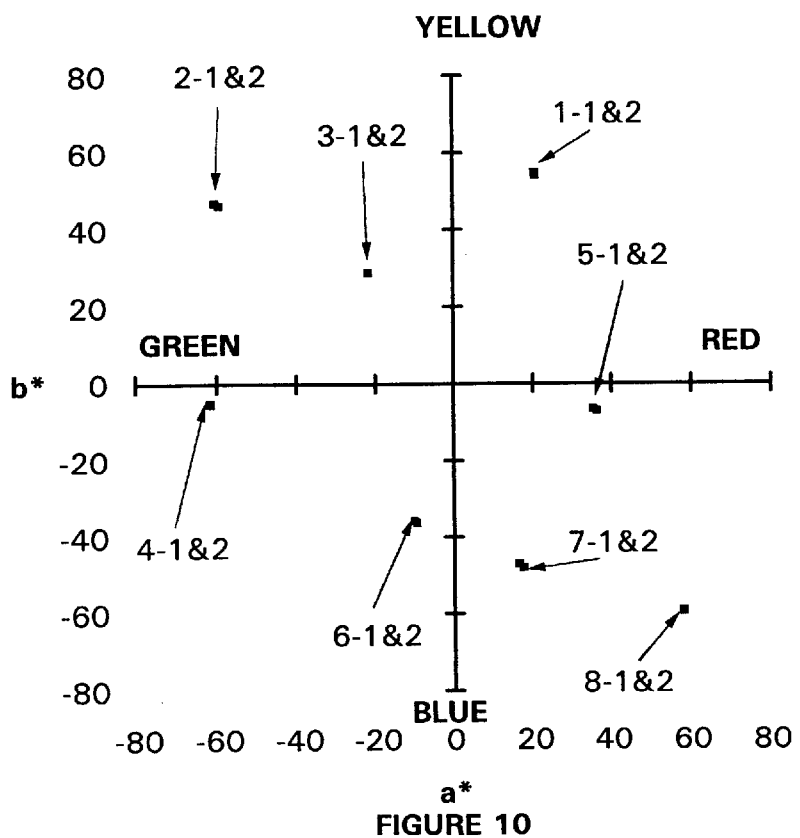
FIG. 10 is a graphical representation of the examples shown in Tables X, XI and XII showing the matching of colors of paired designs at 45° under Illuminant C.

In Tables X, XI and XII there are shown the designs corresponding to the designs shown in Tables IV, V and VI under illuminant C rather than illuminant A. FIGS. 9 and 10 represent graphically the information set forth in Tables X through XII and show the divergence in colors at 10° and the matching of colors at 45°.

TABLE X

PAIRED OPTICALLY VARIABLE STRUCTURES ILLUMINANT "C" AT 45°

| 1) | 3 qw @ 490 nm | and | 4 qw @ 673 nm |
|---|---|---|---|
| 2) | 4 qw @ 600 nm | " | 6 qw @ 617 nm |
| 3) | 2 qw @ 587 nm | " | 6 qw @ 637 nm |
| 4) | 4 qw @ 560 nm | " | 5 qw @ 680 nm |
| 5) | 3 qw @ 571 nm | " | 6 qw @ 668 nm |
| 6) | 2 qw @ 482 nm | " | 5 qw @ 657 nm |
| 7) | 2 qw @ 395 nm | " | 5 qw @ 646 nm |
| 8) | 3 qw @ 612 nm | " | 5 qw @ 625 nm |

TABLE XI

COLOR VALUES FOR EXAMPLES IN TABLE X

| Example | L* | a* | b* | h | C* | Delta h |
|---|---|---|---|---|---|---|
| 1) a, 10 deg. | 43.43 | 38.9 | −1.07 | 358.4 | 38.91 | |
| a, 45 deg. | 70.12 | 20.71 | 53.98 | 69.01 | 57.82 | |
| b, 10 deg. | 47.94 | 67.28 | −64.17 | 316.4 | 92.98 | |
| b, 45 deg. | 77.06 | 20.51 | 54.79 | 69.48 | 58.5 | −0.47 |
| 2) a, 10 deg. | 70.59 | 43.92 | 26.21 | 30.82 | 51.15 | |
| a, 45 deg. | 82.82 | −59.26 | 46.22 | 142.1 | 75.15 | |
| b, 10 deg. | 60.93 | 61.29 | −27.55 | 335.8 | 67.19 | |
| b, 45 deg. | 76.86 | −60.25 | 46.8 | 142.2 | 76.29 | −0.11 |
| 3) a, 10 deg. | 82.42 | 10.57 | 56.87 | 79.47 | 57.85 | |
| a, 45 deg. | 91.91 | −21.75 | 28.77 | 127.1 | 36.06 | |
| b, 10 deg. | 57.36 | 32.99 | −17.27 | 332.4 | 37.23 | |
| b, 45 deg. | 77.83 | −21.76 | 28.84 | 127 | 36.13 | 0.05 |
| 4) a, 10 deg. | 82.62 | −10.03 | 81.72 | 97 | 82.34 | |
| a, 45 deg. | 71.62 | −61.4 | −5.38 | 185 | 61.64 | |
| b, 10 deg. | 75.75 | 14.17 | 7.59 | 28.19 | 16.07 | |
| b, 45 deg. | 61.33 | −61.68 | −5.15 | 184.8 | 61.9 | 0.24 |
| 5) a, 10 deg. | 41.84 | 48.94 | −82.46 | 300.7 | 95.89 | |
| a, 45 deg. | 45.27 | 36.34 | −7.16 | 348.9 | 37.04 | |
| b, 10 deg. | 60.34 | −41.51 | 12.6 | 163.1 | 43.38 | |
| b, 45 deg. | 73.45 | 35.39 | −6.69 | 349.3 | 36.02 | −0.45 |
| 6) a, 10 deg. | 90.18 | −29.4 | 13.02 | 156.1 | 32.15 | |
| a, 45 deg. | 73.57 | −10.13 | −35.74 | 254.2 | 37.15 | |
| b, 10 deg. | 77.72 | −32.2 | 36.15 | 131.7 | 48.42 | |
| b, 45 deg. | 54.15 | −9.56 | −36.36 | 255.3 | 37.6 | |
| 7) a, 10 deg. | 65.11 | 3.21 | 49.13 | 273.7 | 49.24 | |
| a, 45 deg. | 47.28 | 16.19 | −47.11 | 289 | 49.82 | |
| b, 10 deg. | 77.22 | −54.22 | 47.36 | 138.9 | 21.99 | |
| b, 45 deg. | 51.67 | 17.42 | 48.07 | 289.9 | 51.13 | −0.95 |
| 8) a, 10 deg. | 57.8 | −21.96 | −48.94 | 245.8 | 53.64 | |
| a, 45 deg. | 39.33 | 57.93 | −59.39 | 314.3 | 82.97 | |
| b, 10 deg. | 73.45 | −86.61 | 49.34 | 150.3 | 99.68 | |
| b, 45 deg. | 50.08 | 57.92 | −59.69 | 314.1 | 83.17 | 0.15 |

TABLE XII

Pair Total Color Difference (Delta E)
For Examples in Table X

| Design Pair | ΔE 10° | ΔE 45° |
|---|---|---|
| 1 | 69.34 | 6.99 |
| 2 | 57.32 | 6.07 |
| 3 | 81.41 | 14.08 |
| 4 | 78.26 | 10.30 |
| 5 | 132.51 | 28.20 |
| 6 | 26.42 | 19.44 |
| 7 | 112.94 | 4.66 |
| 8 | 118.67 | 10.75 |

Design pairs are from the 45° designs.
Note: The 10° data shows color difference for the 45° color pairs.

Figure 11:
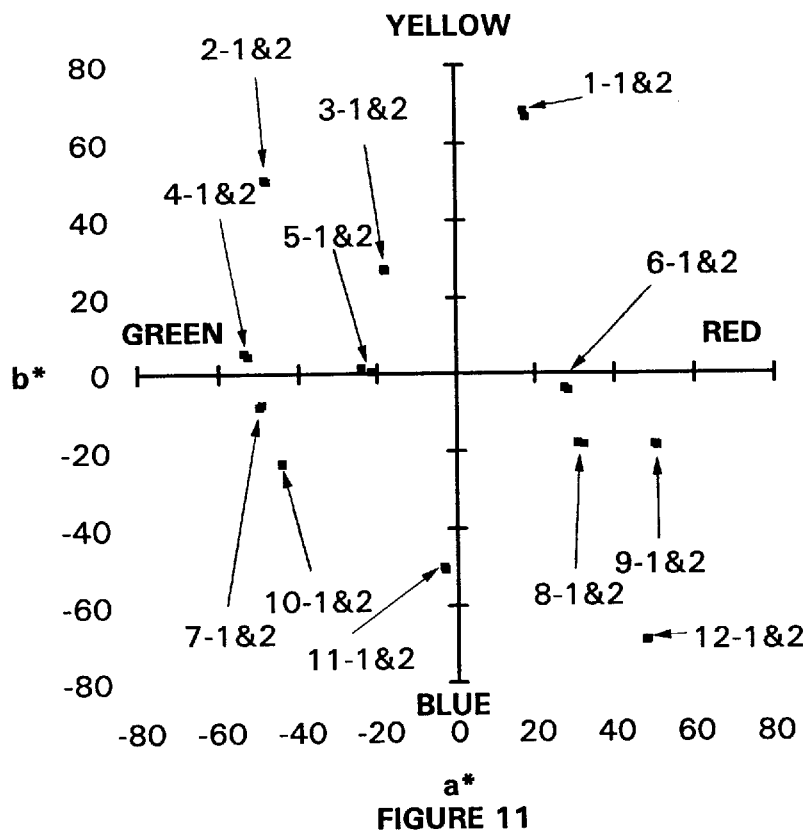
FIG. 11 is a graphical representation of the examples shown in Tables XIII, XIV and XV showing the matching of colors of paired designs at 10° under Illuminant F.
Figure 12:
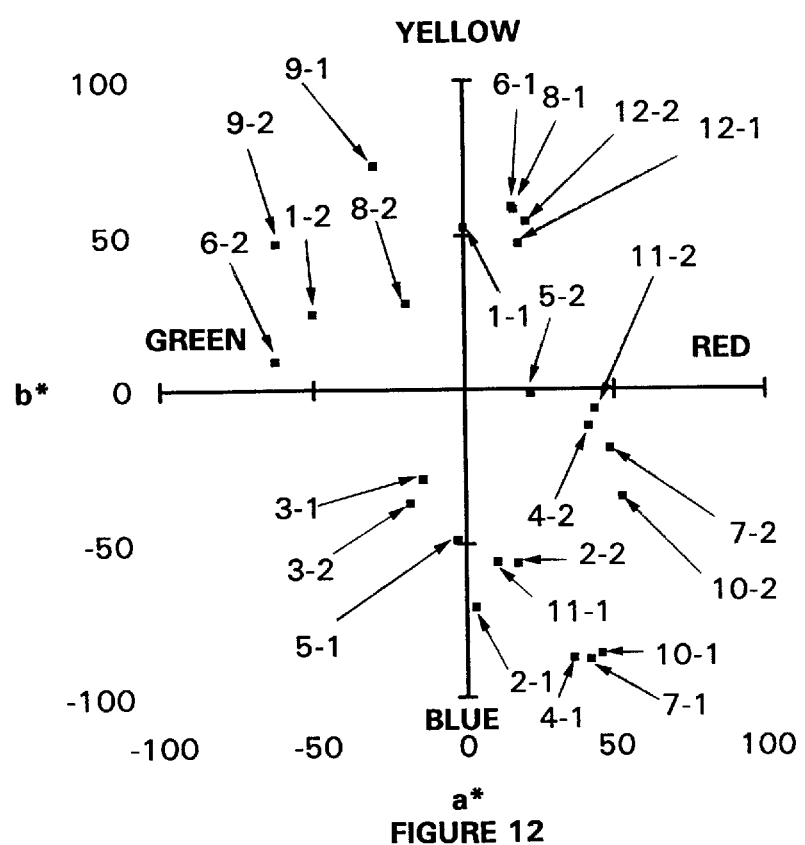
FIG. 12 is a graphical representation of the examples in Tables XIII–XV showing divergence of colors of paired designs at 45° under Illuminant F.

In Tables XIII, XIV and XV set forth below designs are shown corresponding to the designs in Tables I through III except for illuminant F rather than illuminant A and graphical representations of the data presented therein are shown in FIGS. 11 and 12 in which FIG. 11 shows the matching of colors at 10° and FIG. 12 showing the divergence of colors at 45°.

TABLE XIII

PAIRED OPTICALLY VARIABLE STRUCTURES
ILLUMINANT "F" AT 10°

| 1) | 2 qw @ 640 nm | and | 4 qw @ 582 nm |
| 2) | 3 qw @ 689 nm | " | 5 qw @ 644 nm |
| 3) | 2 qw @ 499 nm | " | 5 qw @ 663 nm |
| 4) | 3 qw @ 656 nm | " | 6 qw @ 6B4 nm |

TABLE XIII-continued

PAIRED OPTICALLY VARIABLE STRUCTURES
ILLUMINANT "F" AT 10°

| 5) | 2 qw @ 466 nm | " | 6 qw @ 664 nm |
| 6) | 3 qw @ 490 nm | " | 5 qw @ 694 nm |
| 7) | 3 qw @ 647 nm | " | 6 qw @ 704 nm |
| 8) | 3 qw @ 497 nm | " | 6 qw @ 637 nm |
| 9) | 4 qw @ 620 nm | " | 6 qw @ 605 nm |
| 10) | 3 qw @ 637 nm | " | 5 qw @ 583 nm |
| 11) | 2 qw @ 405 nm | " | 4 qw @ 708 nm |
| 12) | 3 qw @ 525 nm | " | 4 qw @ 677 nm |

TABLE XIV

COLOR VALUES FOR EXAMPLES IN TABLE XIII

| Example | L* | a* | b* | h | C* | Delta h |
|---|---|---|---|---|---|---|
| 1) a, 10 deg. | 70.42 | 17.33 | 68.25 | 75.75 | 70.42 | |
| a, 45 deg. | 91.01 | −0.06 | 52.65 | 90.03 | 52.35 | |
| b, 10 deg. | 81.78 | 18.02 | 66.68 | 74.88 | 69.07 | 0.87 |
| b, 45 deg. | 76.56 | −50.36 | 24.67 | 153.9 | 56.08 | |
| 2) a, 10 deg. | 82.02 | −47.88 | 50.35 | 133.56 | 69.48 | |
| a, 45 deg. | 47.02 | 3.11 | −70.45 | 272.53 | 70.52 | |
| b, 10 deg. | 78.72 | −48.35 | 50.78 | 133.59 | 70.12 | −0.03 |
| b, 45 deg. | 44.8 | 17.49 | −56.3 | 287.26 | 58.96 | |
| 3) a, 10 deg. | 92.38 | −18.21 | 27.65 | 123.37 | 33.11 | |
| a, 45 deg. | 75.84 | −14.15 | −29 | 243.98 | 32.26 | |
| b, 10 deg. | 82.31 | −17.81 | 27.35 | 123.08 | 32.64 | 0.29 |
| b, 45 deg. | 47.84 | −18.63 | −36.81 | 243.15 | 41.25 | |
| 4) a, 10 deg. | 70.22 | −52.74 | 4.55 | 175.07 | 529.3 | |
| a, 45 deg. | 39.29 | 36.13 | −87.28 | 292.48 | 94.46 | |
| b, 10 deg. | 56.94 | −53.73 | 5.39 | 174.27 | 54 | 0.8 |
| b, 45 deg. | 74.02 | 41.47 | −11.9 | 343.98 | 43.14 | |
| 5) a, 10 deg. | 86.1 | −21.62 | 0.36 | 179.06 | 21.62 | |
| a, 45 deg. | 65.94 | −2.79 | −48.83 | 266.73 | 48.91 | |
| b, 10 deg. | 50.31 | −24.08 | 1.4 | 176.68 | 24.12 | 2.38 |
| b, 45 deg. | 80.28 | 22.17 | −1.29 | 356.67 | 22.21 | |
| 6) a, 10 deg. | 44.03 | 27.44 | −3.71 | 352.3 | 27.69 | |
| a, 45 deg. | 72.06 | 16.14 | 59.42 | 74.8 | 61.57 | |
| b, 10 deg. | 79.12 | 28.38 | 4.28 | 351.43 | 28.7 | 0.87 |
| b, 45 deg. | 59.34 | −62.69 | 9.29 | 171.57 | 63.37 | |
| 7) a, 10 deg. | 66.41 | −49.94 | −8.6 | 189.77 | 50.87 | |
| a, 45 deg. | 38.08 | 41.75 | −87.76 | 295.44 | 97.18 | |
| b, 10 deg. | 66.48 | −49.32 | −7.89 | 189.09 | 49.95 | 0.68 |
| b, 45 deg. | 65.69 | 48.61 | −19.05 | 338.6 | 52.21 | |
| 8) a, 10 deg. | 41.58 | 30.62 | −17.96 | 329.62 | 35.5 | |
| a, 45 deg. | 69.56 | 16.73 | 58.62 | 74.07 | 60.96 | |
| b, 10 deg. | 52.11 | 32.22 | −18.3 | 330.4 | 37.06 | −0.78 |
| b, 45 deg. | 82.18 | −19.46 | 27.98 | 124.82 | 34.98 | |
| 9) a, 10 deg. | 65.12 | 50.15 | −18.32 | 339.93 | 53.4 | |
| a, 45 deg. | 87.08 | −29.95 | 72.63 | 112.41 | 78.57 | |
| b, 10 deg. | 67.08 | 50.75 | −18.6 | 339.88 | 54.05 | 0.05 |
| b, 45 deg. | 73.08 | −62.1 | 47.61 | 142.52 | 78.25 | |
| 10) a, 10 deg. | 62.04 | 44.38 | −23.12 | 207.52 | 50.04 | |
| a, 45 deg. | 37.3 | 45.43 | −85.71 | 297.93 | 97 | |
| b, 10 deg. | 49.09 | −44.37 | −23.42 | 207.83 | 50.17 | −0.31 |
| b, 45 deg. | 61.23 | 52.61 | −34.86 | 326.47 | 63.11 | |
| 11) a, 10 deg. | 65.91 | −3.46 | 49.97 | 266.03 | 50.09 | |
| a, 45 deg. | 48.12 | 10.55 | −55.9 | 280.68 | 56.89 | |
| b, 10 deg. | 43.12 | −3.06 | −50.61 | 266.54 | 50.7 | −0.51 |
| b, 45 deg. | 68.5 | 43.66 | −6.27 | 351.83 | 44.11 | |
| 12) a, 10 deg. | 34.16 | 48.14 | −69 | 304.9 | 84.13 | |
| a, 45 deg. | 59.75 | 18.29 | 47.59 | 68.98 | 50.98 | |
| b, 10 deg. | 42.9 | 47.78 | −69.2 | 304.62 | 84.09 | 0.28 |
| b, 45 deg. | 80.42 | 20.93 | 54.69 | 69.06 | 58.55 | |

TABLE XV

TOTAL COLOR DIFFERENCE (DELTA E)
FOR EXAMPLES IN TABLE XIII
Pair Total Color Difference (Delta E)

| Des. Pair | III. F Delta E | |
|---|---|---|
| | 10 Deg. | 45 Deg. |
| 1 | 11.49 | 59.34 |
| 2 | 3.36 | 20.30 |
| 3 | 37.40 | 29.41 |
| 4 | 13.34 | 83.17 |
| 5 | 35.89 | 55.58 |
| 6 | 35.11 | 94.28 |
| 7 | 0.95 | 74.37 |
| 8 | 10.66 | 49.07 |
| 9 | 2.07 | 43.08 |
| 10 | 12.95 | 56.66 |
| 11 | 22.80 | 63.05 |
| 12 | 8.75 | 22.01 |

Design pairs are from the 10° designs.
Note: The 45° data shows color difference at 45° for the 10° color pairs.

Figure 13:
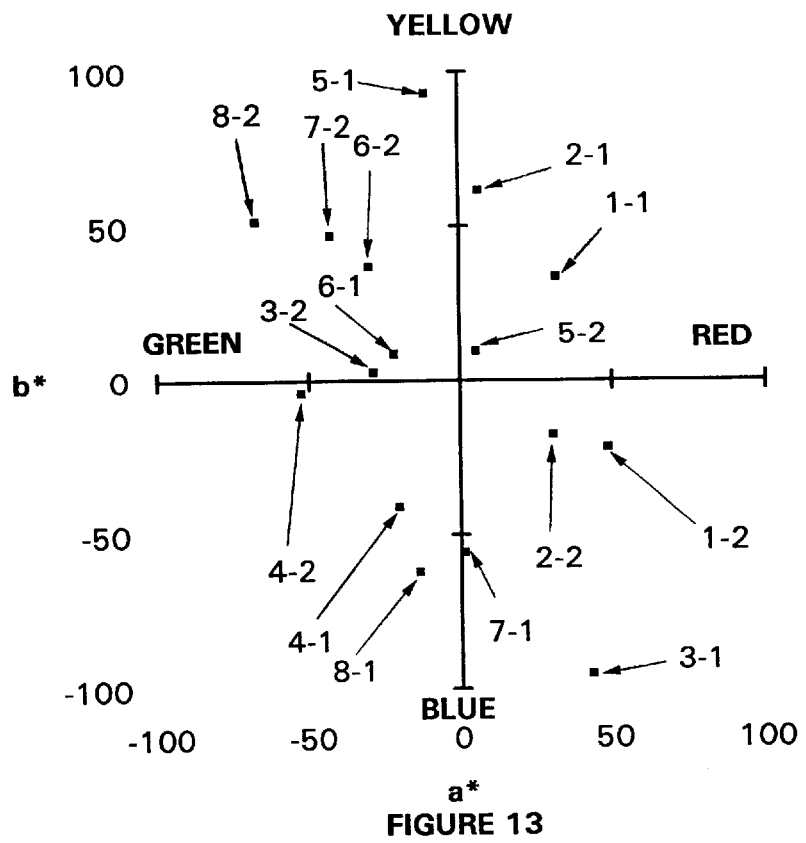
FIG. 13 is a graphical representation of the examples shown in Tables XVI–XVIII showing divergence of colors of paired designs at 10° under Illuminant F.
Figure 14:
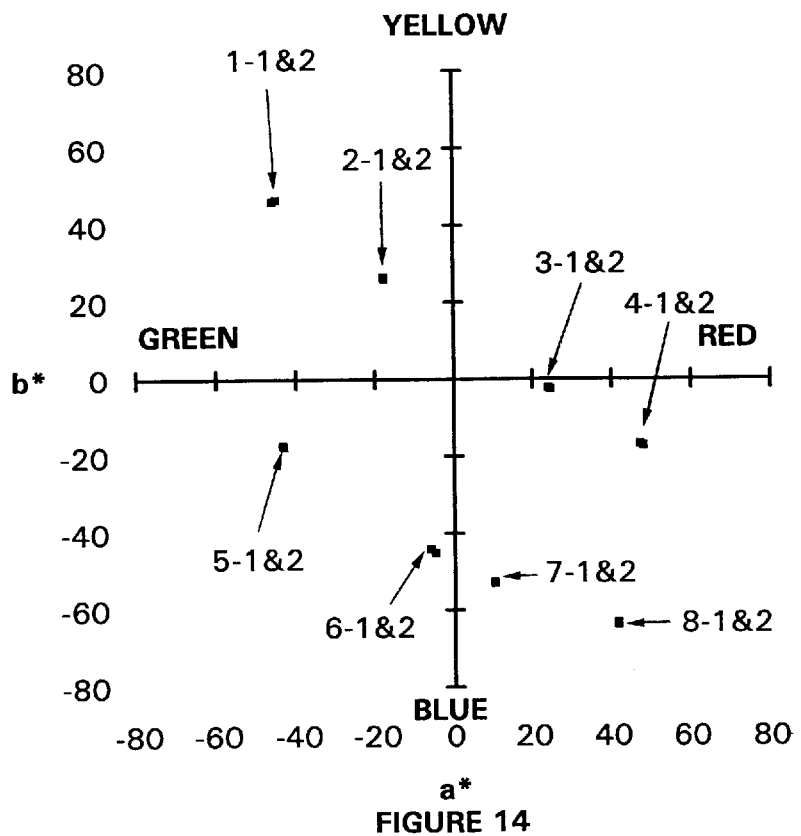
FIG. 14 is a graphical representation of the examples in Tables XVI–XVIII showing the matching of colors of paired designs at 45° under Illuminant F.

In Tables XVI, XVII and XVIII set forth below, data are shown corresponding to the designs in Tables IV through VI except with illuminant F rather than illuminant A Graphical representations of these designs are shown in FIG. 13 and 14 in which FIG. 13 shows a divergence in colors at 10° and FIG. 14 shows the matching of colors at 45°.

TABLE XVI

PAIRED OPTICALLY VARIABLE STRUCTURES
ILLUMINANT F AT 45°

| 1) | 4 qw @ 597 nm | and | 6 qw @ 621 nm |
| 2) | 2 qw @ 576 nm | " | 6 qw @ 638 nm |
| 3) | 3 qw @ 566 nm | " | 6 qw @ 666 nm |
| 4) | 5 qw @ 573 nm | " | 6 qw @ 698 nm |
| 5) | 4 qw @ 555 nm | " | 5 qw @ 677 nm |
| 6) | 2 qw @ 475 nm | " | 5 qw @ 656 nm |
| 7) | 2 qw @ 394 nm | " | 5 qw @ 648 nm |
| 8) | 3 qw @ 608 nm | " | 5 qw @ 627 nm |

TABLE XVII

COLOR VALUES FOR EXAMPLES IN TABLE XVI

| Example | L* | a* | b* | h | C* | Delta h |
|---|---|---|---|---|---|---|
| 1) a, 10 deg. | 75.86 | 31.97 | 33.73 | 46.54 | 46.47 | |
| a, 45 deg. | 82 | 45.7 | 46.24 | 134.66 | 65.02 | |
| b, 10 deg. | 58.73 | 48.61 | −21.89 | 315.75 | 53.31 | |
| b, 45 deg. | 79.13 | 44.8 | 46.61 | 133.86 | 64.65 | 0.8 |
| 2) a, 10 deg. | 87.43 | 6.52 | 61.63 | 83.96 | 51.98 | |
| a, 45 deg. | 91.97 | −17.59 | 26.08 | 124 | 31.46 | |
| b, 10 deg. | 51.8 | 30.69 | −17.82 | 329.85 | 35.49 | |
| b, 45 deg. | 82.27 | −17.75 | 26.59 | 123.73 | 31.97 | 0.27 |
| 3) a, 10 deg. | 35.02 | 43.33 | −95.12 | 294.49 | 104.53 | |
| a, 45 deg. | 47.02 | 24.04 | −2.29 | 354.55 | 24.15 | |
| b, 10 deg. | 50.72 | −28.44 | 2.8 | 174.39 | 28.58 | |
| b, 45 deg. | 79.81 | 24.6 | −2.59 | 353.99 | 24.74 | 0.56 |
| 4) a, 10 deg. | 45.06 | −20.31 | 40.84 | 243.56 | 45.61 | |
| a, 45 deg. | 66.06 | 47.12 | −16.88 | 340.29 | 50.05 | |
| b, 10 deg. | 63.59 | −52.86 | 4.05 | 184.38 | 53.01 | |
| b, 45 deg. | 68.27 | 47.87 | −17.36 | 340.07 | 50.92 | 0.22 |
| 5) a, 10 deg. | 87.84 | −11.09 | 92.92 | 96.81 | 93.58 | |
| a, 45 deg. | 84.39 | 43.16 | −17.6 | 202.18 | 46.61 | |
| b, 10 deg. | 82.22 | 5.43 | 9.35 | 59.86 | 10.81 | |
| b, 45 deg. | 52.37 | 43.48 | −17.16 | 201.54 | 46.75 | 0.64 |
| 6) a, 10 deg. | 88.27 | −21.64 | 8.33 | 158.96 | 23.19 | |
| a, 45 deg. | 68.69 | −6.07 | 44.24 | 262.19 | 44.66 | |
| b, 10 deg. | 81.49 | −29.72 | 37.27 | 128.57 | 47.67 | |
| b, 45 deg. | 46.21 | 4.92 | 45.15 | 263.78 | 45.42 | −1.59 |
| 7) a, 10 deg. | 61.81 | 1.24 | −55.67 | 271.27 | 55.68 | |
| a, 45 deg. | 45.3 | 10.27 | −52.64 | 281.04 | 53.64 | |
| b, 10 deg. | 79.83 | 42.51 | 47.11 | 132.06 | 63.46 | |
| b, 45 deg. | 45.01 | 10.35 | −53.08 | 281.04 | 54.08 | 0 |
| 8) a, 10 deg. | 49.35 | −13.76 | −62.12 | 257.51 | 63.62 | |
| a, 45 deg. | 38.39 | 41.5 | −63.37 | 303.22 | 75.75 | |
| b, 10 deg. | 72.05 | −67.21 | 51.64 | 142.46 | 84.75 | |
| b, 45 deg. | 45.64 | 41.56 | −63.88 | 303.04 | 76.21 | 0.18 |

TABLE XVIII

TOTAL COLOR DIFFERENCE (DELTA E)
FOR EXAMPLES IN TABLE XVI
Pair Total Color Difference (Delta E)

| Des. Pair | ΔE 10 Deg. | ΔE 45 Deg. |
|---|---|---|
| 1 | 60.53 | 3.03 |
| 2 | 90.37 | 9.71 |
| 3 | 122.42 | 32.80 |
| 4 | 52.50 | 2.38 |
| 5 | 85.37 | 12.03 |
| 6 | 30.80 | 22.53 |
| 7 | 113.15 | 0.53 |
| 8 | 127.72 | 7.27 |

Design pairs are from the 45° designs.
Note: The 10° data shows color difference at 10° for the 45° color pairs.

In viewing the data set forth in the foregoing tables, it can be seen that there is a color difference for different types of illumination. In other words, under one illuminant there may be an exact color match whereas under another illuminant there may no longer be an exact color match. Thus there is a color change which traditionally is known as color metamerism. In viewing Table III, example 1 gives the lowest color difference of 1.92 whereas example 6 gives the highest color difference of 29.63 for designs for matching colors at 10°. Table VI for matching colors at 45°, the minimum color difference is 2.52 for example 1 and the maximum color difference is 27.77 for example 5. Similar analyses can be carried out for Tables IX, XII, XV and XVIII, to give a minimum of 4.49 and a maximum 30.21 for Table IX, a minimum of 4.66 and a maximum 28.2 for Table XII, a minimum 0.95 and a maximum of 37.4 for Table XV and a minimum of 0.53 and a maximum of 32.8 for Table XVIII.

Similarly, the data in Tables I through XVIII can be analyzed to ascertain the paired designs under the illuminants A, C and F as set forth below in Table XIX.

TABLE XIX

TOTAL COLOR DIFFERENCE FOR PAIRED OPTICALLY
VARIABLE STRUCTURES FROM DIELECTRIC THICKNESS
TRACKS UNDER ILLUMINANTS "A", "C" AND "F"

| Pair | Ill. | Angle | Delta E | Designs 1 and 2 |
|---|---|---|---|---|
| 1 | A | 10 | 1.92 | 2 qw @ 620 & 4 qw @ 587 |
| 3 | A | 10 | 5.55 | 3 qw @ 697 & 5 qw @ 649 |
| 1 | A | 45 | 2.52 | 3 qw @ 480 & 4 qw # 679 |
| 3 | A | 45 | 5.26 | 4 qw @ 604 & 6 qw @ 625 |
| 1 | C | 10 | 4.49 | 2 qw @ 625 & 4 qw @ 582 |
| 3 | C | 10 | 6.29 | 3 qw @ 692 & 5 qw @ 641 |
| 7 | C | 45 | 4.66 | 2 qw @ 395 & 5 qw @ 646 |

TABLE XIX-continued

TOTAL COLOR DIFFERENCE FOR PAIRED OPTICALLY
VARIABLE STRUCTURES FROM DIELECTRIC THICKNESS
TRACKS UNDER ILLUMINANTS "A", "C" AND "F"

| Pair | Ill. | Angle | Delta E | Designs 1 and 2 |
|---|---|---|---|---|
| 2 | C | 45 | 6.99 | 4 qw @ 600 & 6 qw @ 617 |
| 7 | F | 10 | 0.95 | 3 qw @ 647 & 6 qw @ 704 |
| 9 | F | 10 | 2.07 | 4 qw @ 620 & 6 qw @ 605 |
| 7 | F | 45 | 0.53 | 2 qw @ 394 & 5 qw @ 648 |
| 4 | F | 45 | 2.38 | 5 qw @ 573 & 6 qw @ 698 |

As can be seen in Table XIX above, the best two design pairs for each illuminant and at each angle have been selected. For example, two design pairs at a 10° viewing angle under Illuminant A were shown to have the lowest color mismatch. Similarly, two different paired designs had the best color match at a 45° viewing angle under Illuminant A. Those which have been selected are the ones which have the smallest color difference for the chosen angle. Similarly, the examples have been selected for the best two color matched pairs under Illuminant C and similarly for Illuminant F under the two different orientations. Using this criteria the best overall design pair was found under Illuminant F at 45°. By reviewing Table XIX, the color difference for the pair: 2 qw at 394 nanometers and 5 qw at 648 nanometers has a ΔE at 0.53.

In Table XX set forth below, the two design pairs selected in Table XIX were analyzed to ascertain whether or not a color match still existed under different illuminants. When those designs are forced under Illuminant A, the color difference in terms of ΔE is now 36.44 and when it is placed under Illuminant C it has a value of only 6.15. Thus it can be seen that when the best pair of optically variable structures under Illuminant F is placed under a different illumination the color match is no longer an exact color match. Other paired designs were also viewed under different illuminants to see the effect in their ΔE color difference and this data has been tabulated in Table XX.

TABLE XX

Best 2 Under Ill. A, C & F

| Pair | Code (*) | L* | a* | b* | hue | C* | Delta E |
|---|---|---|---|---|---|---|---|
| | | 10 Deg. Ill. A Design (known) under C | | | | | |
| 1 | 4C1 | 74 | 19.13 | 60.87 | 72.55 | 63.8 | 12.52 |
|   | 4C2 | 75.31 | 27.54 | 51.69 | 61.95 | 58.56 | |
| 2 | 4C1 | 83.46 | −59.1 | 54.67 | 137.23 | 80.51 | 15.77 |
|   | 4C2 | 77.45 | −48.41 | 44.75 | 137.25 | 65.9.2 | |
| | | 45 Deg. Ill. A Design (known) under C | | | | | |
| 1 | 4C1 | 73.58 | 18.87 | 54.16 | 70.79 | 57.35 | 11.19 |
|   | 4C2 | 75.42 | 27.01 | 46.7 | 59.96 | 53.94 | |
| 2 | 4C1 | 83.39 | −56.17 | 50.41 | 138.09 | 75.48 | 14.80 |
|   | 4C2 | 77.66 | 45.77 | 41.57 | 137.76 | 61.83 | |
| | | 10 Deg. Ill. A Design (known) under F | | | | | |
| 1 | 7F1 | 76.2 | 15.29 | 67.44 | 77.22 | 89.15 | 13.84 |
|   | 7F2 | 79.96 | 22.85 | 56.47 | 67.97 | 60.92 | |
| 2 | 7F1 | 84.08 | 43.8 | 60.17 | 126.05 | 74.43 | 14.95 |
|   | 7F2 | 80.08 | −40.99 | 46.04 | 131.68 | 61.64 | |
| | | 45 Deg. Ill. A Design (known) under F | | | | | |
| 1 | 7F1 | 75.6 | 1.5 | 59.87 | 75.93 | 61.72 | 12.08 |
|   | 7F2 | 79.79 | 22.48 | 51.36 | 66.37 | 56.06 | |

TABLE XX-continued

Best 2 Under Ill. A, C & F

| Pair | Code (*) | L* | a* | b* | hue | C* | Delta E |
|---|---|---|---|---|---|---|---|
| 2 | 7F1 | 84.01 | 41.84 | 55.32 | 127.1 | 69.37 | 13.13 |
|   | 7F2 | 80.19 | −39 | 43.08 | 132.16 | 58.11 | |
| | | 10 Deg. Ill. C Design (known) under A | | | | | |
| 1 | 5A1 | 76.56 | 30.65 | 63.38 | 64.19 | 70.4 | 9.83 |
|   | 5A2 | 81.04 | 24.43 | 69.53 | 70.64 | 73.7 | |
| 2 | 5A1 | 80.3 | −56.04 | 37.75 | 146.03 | 87.57 | 12.63 |
|   | 5A2 | 74.21 | −64.27 | 45.14 | 144.92 | 78.54 | |
| | | 45 Deg. Ill. C Design (known) under A | | | | | |
| 1 | 5A1 | 44.65 | −9.94 | 47.69 | 258.22 | 48.72 | 26.98 |
|   | 5A2 | 48.76 | 15.53 | −55.58 | 285.61 | 57.71 | |
| 2 | 5A1 | 80.42 | −53.18 | 35.31 | 146.42 | 63.83 | 11.42 |
|   | 5A2 | 74.5 | −60.78 | 41.44 | 145.71 | 73.57 | |
| | | 10 Deg. Ill. C Design (known) under F | | | | | |
| 1 | 7F1 | 74.77 | 15.89 | 67.78 | 76.8 | 69.62 | 7.41 |
|   | 7F2 | 81.78 | 18.02 | 66.68 | 74.88 | 69.07 | |
| 2 | 7F1 | 82.84 | −46.46 | 54.11 | 130.65 | 71.32 | 7.93 |
|   | 7F2 | 77.77 | −52.41 | 52.79 | 134.8 | 74.39 | |
| | | 45 Deg. Ill. C Design (known) under F | | | | | |
| 1 | 7F1 | 45.55 | 10.33 | −52.99 | 281.03 | 53.98 | 4.12 |
|   | 7F2 | 44.83 | 13.98 | −54.75 | 284.32 | 56.51 | |
| 2 | 7F1 | 82.9 | −44.16 | 50.23 | 131.32 | 66.88 | 7.86 |
|   | 7F2 | 77.88 | −50.07 | 48.97 | 135.64 | 70.03 | |
| | | 10 Deg. Ill. F Design (known) under A | | | | | |
| 1 | 5A1 | 65.98 | −70.89 | −18.99 | 195 | 73.39 | 28.11 |
|   | 5A2 | 65.84 | −63.36 | 8.09 | 172.72 | 63.88 | |
| 2 | 5A1 | 68.31 | 55.32 | 4.94 | 5.11 | 55.54 | 22.70 |
|   | 5A2 | 68.99 | 53.67 | −17.69 | 341.76 | 56.52 | |
| | | 45 Deg. Ill. F Design (known) under A | | | | | |
| 1 | 5A1 | 35.45 | −7.52 | −26.69 | 254.27 | 27.73 | 36.44 |
|   | 5A2 | 48.87 | 11.84 | −54.49 | 282.26 | 55.76 | |
| 2 | 5A1 | 76.53 | −45.75 | 39.82 | 138.96 | 60.66 | 111.57 |
|   | 5A2 | 69.92 | 50.45 | −16.31 | 342.09 | 53.02 | |
| | | 10 Deg. Ill. F Design (known) under C | | | | | |
| 1 | 4C1 | 71.45 | −66.19 | 4.28 | 183.7 | 66.33 | 18.17 |
|   | 4C2 | 69.19 | −54.17 | 9.16 | 170.41 | 54.94 | |
| 2 | 4C1 | 62.73 | 65.58 | −12.97 | 348.82 | 66.85 | 14.03 |
|   | 4C2 | 64.51 | 64.5 | −26.84 | 337.41 | 69.86 | |
| | | 45 Deg. Ill. F Design (known) under C | | | | | |
| 1 | 4C1 | 47 | 16.12 | 46.81 | 289 | 49.51 | 6.15 |
|   | 4C2 | 52.05 | 12.67 | −46.18 | 285.34 | 47.88 | |
| 2 | 4C1 | 77.8 | 40.92 | 39.28 | 136.17 | 56.72 | 121.10 |
|   | 4C2 | 65.7 | 60.89 | −25.17 | 337.54 | 65.89 | |

In the event that the present invention is utilized for preparing optically variable structures to be used with currency to prevent counterfeiting, it should be appreciated that bank-note exchange is most likely to take place under cool fluorescent lighting as typically found in banks and retail stores. It is therefore believed that design pairs should be utilized which have matching colors under such lighting as for example Illuminant F as set forth above. Utilizing such principles the best overall design pair would be one involving two quarter waves at 394 nanometers and five quarter waves at 648 nanometers.

Although the design pair involving two quarterwaves at 394 nanometers and five quarterwaves at 648 nanometers is the best overall design pair, the design at 394 nanometers does not have much of an optical shift, as can be seen by referring to FIGS. 13 and 14. This design pair, labeled "7-1" and "7-2" does have a divergence of color at 10°, but the change in color for the two quarterwave design is small. Thus, a preferable design pair would be Pair 4, which has the designs five quarterwaves at 573 nanometers and six quarterwaves at 698 nm. Both of these designs have substantial color shift with angle. They are widely separated in color at 10° and have a fairly good color match at 45°.

It can be seen by referring to Tables II, V, VIII, XI, XIV and XVII that the color match in terms of hue is, for all practical purposes, an exact match. The ΔE differences for the various design pairs as shown in Tables III, VI, IX, XII, XV and XVIII are a consequence of slight variations of brightness, L* and in chroma, C*. These color variations can be minimized by adding a black or neutral transparent pigment or nontransparent pigment to the design of the pair which has the highest chroma and brightness value. The addition is made until the brightness and chroma are matched to the lower chroma and brightness design of the pair. Thus, all design pairs can be optimized for color matching by the judicious additions of other color modifying materials.

All the foregoing principles can be utilized in conjunction with the optically variable device 11 shown in FIG. 1 in which paired optically variable structures or pigments utilizing those principles can be incorporated into the two different optical variable devices 17 and 18 shown therein and which can be utilized in the form of an ink or a paint with the appropriate vehicles for the pigments.

To achieve high color saturation and to have large color travel as a function of viewing angle which is desired in connection with the present invention, interference type pigments are utilized. In such pigments, metal dielectric or all dielectric interference stacks are utilized.

Figure 15:
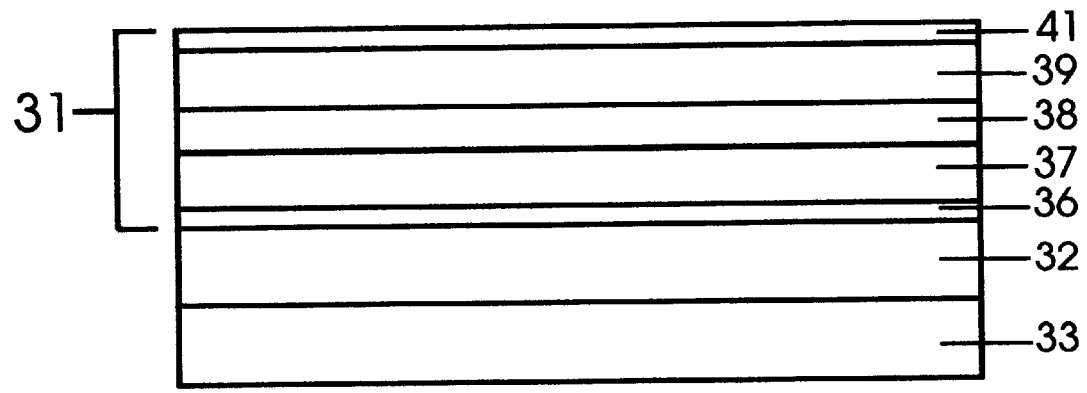
FIG. 15 is a cross-sectional view of a paired optically variable article incorporating the present invention utilizing a symmetric metal dielectric interference stack.

A typical metal dielectric asymmetric interference stack 31 as shown in FIG. 15 is formed as a sheet on a soluble release layer 32 deposited on a flexible web 33 serving as a substrate. The multilayer interference thin film stack 31 can be removed by passing the web or substrate through a solvent bath. As the soluble release layer 32 dissolves, the thin sheet of interference film 31 disintegrates into a multitude of flakes. Since the flakes have two planar surfaces, it is desirable to provide an optical design for the multilayer interference stack or film so that it is symmetric and presents the same design on each side. After collecting the flakes and washing them to free them of release material, a pigment is produced by grinding the flakes to a size ranging from 2 to 200 microns and preferably a size ranging from 2 to 20 microns by grinding or pulverizing without destroying the color characteristics of the flakes. The flakes should have an aspect ratio of at least 2 to 1 with respect to the surfaces of the flakes and the thicknesses of the flakes and preferably 10 to 1 in order to preserve the correct particle orientation when they are placed in the desired vehicle for an ink or a paint to maximize the brightness and color purity of the ink or paint.

Thus in accordance with the present invention it is desirable to utilize a symmetric metal dielectric stack 31 as shown in FIG. 15 which can be comprised of only three materials and five layers to produce a strongly dichroic optically variable structure. It is comprised of a semi-opaque metal layer 36 which is formed on the release coat 32 carried by the flexible web 33. The layer 36 is followed by a dielectric layer 37, a thick metal reflecting layer 38, another dielectric layer 39 and a final thin semi-opaque metal layer 41. For the production of a hot stamping dichroic foil (i.e., an optically variable foil), only three layers are required. These three layers would consist of: 36, 37 and 38, as shown in FIG. 15. In this form, the layers 36 and 38 are inverted. When the multilayer thin film is separated from the release coat 32 and the flexible web 33 and attached by means of an adhesive to a counter surface, the layer 36 faces the viewer. By way of example each of the thin metal layers 36 and 41 may be formed of a nominal five nanometer thick layer of chromium and each of the dielectric layers 37 and 39 can be formed from a suitable dielectric material such as silicon dioxide to an optical thickness of a plurality of half waves at a particular design wavelength. The metal reflecting layer 38 may be formed of a layer of aluminum formed to the thickness of approximately 80 nanometers to provide opacity and high reflection. Although a layer of reflecting metal of greater thickness can be utilized, it is believed that it is preferable to minimize the stress in this layer by providing a thin layer as well as to maintain the correct aspect ratio for the product when in the form of a pigment.

It should be appreciated that the materials mentioned are by way of example only and that other grey metals such as nickel and Inconel when n and k (n=real part of refractive index and k=imaginary part of the refractive index) have a high nk product can be utilized in place of chromium. Also in place of silicon dioxide having an index of refraction of 1.46 for the dielectric, other low index materials having an index of refraction of 1.65 or less such as magnesium fluoride having an index of 1.38 and aluminum oxide having an index of 1.65 can be utilized or even lower reflecting metals, such as chromium, nickel or palladium for example, can be used for lower reflecting pigments. In place of aluminum as the metal reflecting layer, the optical metals such as gold, copper and silver can be utilized.

It also should be appreciated if desired, an asymmetric metal dielectric interference stack can be provided if that is desired. When such is the case, the metal reflecting layer 37 can be formed directly onto the release layer followed by the dielectric layer 39 and the thin metal semitransparent metal layer 41. It must be appreciated that such a three-layer design when removed from the web would produce an optically variable pigment with lower chroma than a five-layer symmetrical stack but would nevertheless have dichroic features, i.e., color shift with viewing angle, and could potentially be used to produce lower chroma pairs of pigments with a color match at one angle and no color match at any other angle. These pigments would be equivalent to those already described, except that they would have lower overall chroma so that the designs listed in Tables I, IV, VII, X, XIII and XVI would have chroma compression around the origin of the a*b* plot, but nevertheless would have essentially the same color hue match.

Figure 16:
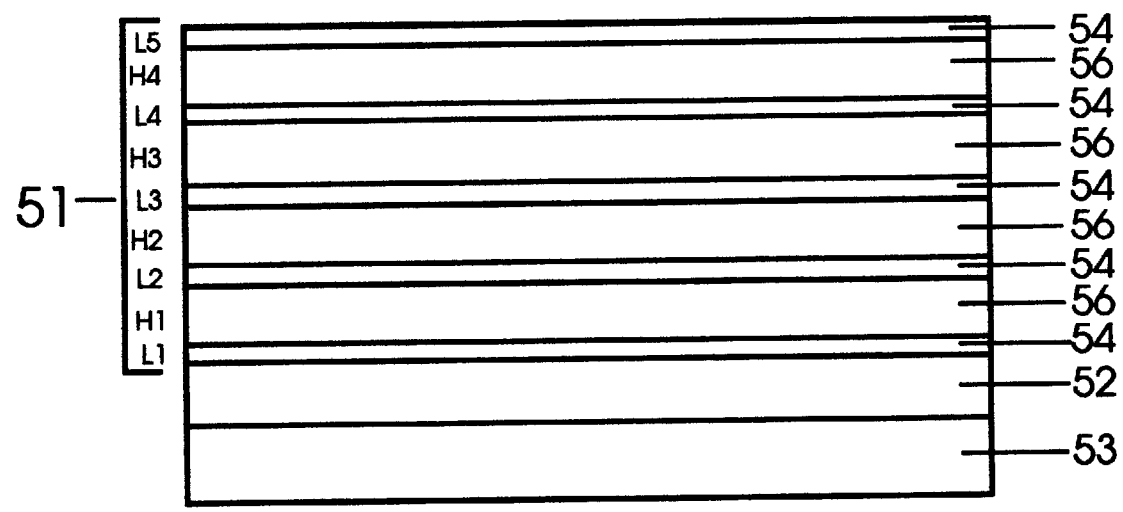
FIG. 16 is a cross-sectional view of a paired optically variable article having an all dielectric symmetrical interference stack.

If desired an all dielectric interference stack can be provided where that is deemed appropriate where the additional layers typically required can be provided without undue expense. As is shown in FIG. 16, an all dielectric interference stack 51 can be provided on a release coat 52 carried by a flexible web or substrate 53. Such a dielectric stack is comprised of alternate layers 54 and 56 with the low index layers being identified as L1 through L5 and having an index refraction of 1.35 to 1.65 and the high index layers being identified as H1 through H4 having a high index of refraction of 1.7 to 2.4 for a total of nine layers. A wide variety of low and high index materials can be utilized in such a multilayer stack. For example, zinc sulfide can be utilized with magnesium fluoride and titanium dioxide can be utilized with silicon dioxide. Other dielectric materials can also be used such as germanium, silicon, indium tin oxide, indium oxide and silicon monoxide.

The design of an all dielectric stack may be expressed as follows:

$$(L/2\ H\ L/2)^n$$

where L and H designate quarter wave optical thickness of the low and high index layers respectively such that L/2 represents an eighth wave optical thickness of the low index layer where n≧2. Such a multilayer stack can be separated from the web 53 in the same manner hereinbefore described and reduced to the sizes hereinbefore described to provide platelets with an aspect ratio in which the major planar dimension of the surfaces is at least two to one with respect to the thickness and preferably ten to one to maximize brightness and color purity of the ink or paint in which pigment platelets or flakes or particles are to be used. Again it should be appreciated, that if desired an asymmetric all dielectric stack can be created merely by combining the first four layers L1 and L2 and H1 and H2.

For example, in connection with the foregoing it has been found that paired optically variable foils and/or pigments with the same matched colors at 0° and 45° for an all-dielectric design can be achieved in which chroma and hue match. One design consists of (1 QW $ZrO_2$/1 QW $SiO_2$)³/1 QW $ZrO_2$ and an additional design: (1 QW $ZrO_2$/3 QW $SiO_2$)³1 QW $ZrO_2$ in which the thicknesses of the quarter wave ranged from 400 nanometers to 2500 nanometers. For the single quarter wave design there are three possible matched pairs at 0° two matched pairs at 45°. Conversely, analyzing chroma and hue variation for the design (1 QW $ZrO_2$/3 QW $SiO_2$)³/1 qw $ZrO_2$ at 0° there are two color match pairs at 45° and there are four color match pairs achievable. Table XXI shows the dielectric pairs that have a color match at 0° or at 45°.

In connection with the foregoing, it should be appreciated that merely increasing the number of pairs of the dielectric design does not make it possible to achieve the coincidence of color matching. However, by increasing the individual thicknesses of the layers, coincidence in color matching can be achieved.

TABLE XXI

Dielectric Pairs That Match Hue and Chroma at Angle

| Design | Angle | Design Pair | a* | b* | L* |
|---|---|---|---|---|---|
| ($ZrO_2$/$SiO_2$)³$ZrO_2$ | 0 Deg. | 1 qw @ 495 nm | −43.8 | −6.41 | 83.61 |
| | | 1 qw @ 1480 nm | −45.25 | −5.56 | 57.96 |
| | | 1 qw @ 540 nm | −33.6 | 50.83 | 90.95 |
| | | 1 qw @ 1680 nm | 33.75 | 54.24 | 75.20 |
| ($ZrO_2$/$SiO_2$)³$ZrO_2$ | 45 Deg. | 1 qw @ 610 nm | −26.63 | 57.32 | 88.97 |
| | | 1 qw @ 1860 nm | −26.7 | 55.05 | 73.70 |
| | | 1 qw @ 550 nm | −37.45 | −1.47 | 83.25 |
| | | 1 qw @ 1630 nm | −39.42 | −1.2 | 59.28 |
| ($ZrO_2$/3 $SiO_2$)³$ZrO_2$ | 0 Deg. | 1 qw @ 590nm | 16.18 | 44.19 | 78.33 |
| | | 1 qw @ 870 nm | 18.2 | 42.68 | 61.57 |
| | | 1 qw @ 615 nm | 43.49 | 17.89 | 70.62 |
| | | 1 qw @ 940 nm | 44.46 | 16.09 | 46.57 |
| ($ZiO_2$/3 $SiO_2$)³$ZrO_2$ | 45 Deg. | 1 qw @ 700 nm | 45.13 | 9.82 | 67.18 |
| | | 1 qw @ 1030 nm | 45.68 | 7.98 | 48.90 |
| | | 1 qw @ 760 nm | 30.4 | −20.84 | 55.39 |
| | | 1 qw @ 2220 nm | 31.32 | −19.38 | 51.52 |

Thus it can be seen that metal-dielectric as well as all dielectric interference thin films can be utilized in the optically variable pigments utilized herein to provide the paired optically variable structures hereinbefore described.

The optically variable structures of the present invention are inherently light fast. This inherency is derived from the fact that the color that emanates from the pigment is due to an interference effect and is not based on any chromophore that can be bleached by ultraviolet light. All the materials used in the construction of the optically variable pigment do not have any color or any chromophore and are, in fact, colorless in themselves. For example, the metals aluminum and chromium are silver and grey and the dielectric magnesium fluoride is water-white transparent.

Figure 17:
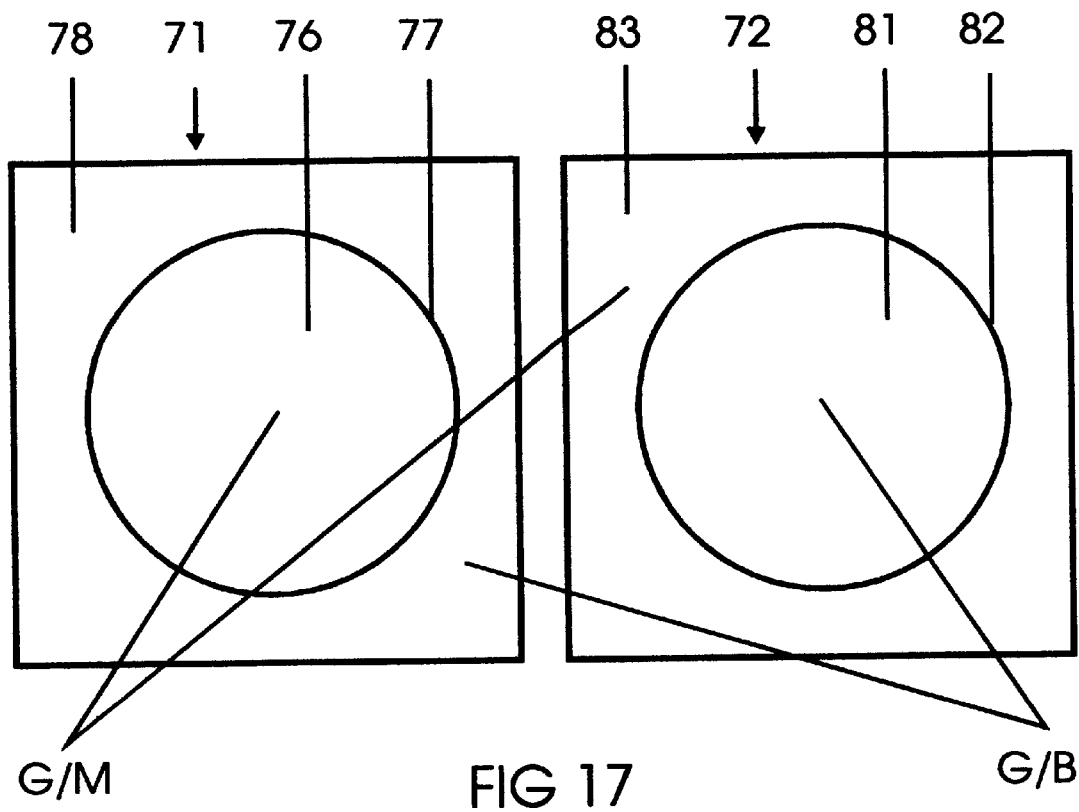
FIG. 17 is a plan view of a pair of paired optically variable articles incorporating the present invention and utilizing paired optically variable structures.

In FIG. 17, there is shown a pair of paired optically variable devices incorporating the present invention. On the left-hand side of FIG. 17 there is shown a first or one paired optically variable device 71 and on the right-hand side there is shown a second or another paired optically variable device 72 with both devices 71 and 72 having the same color at one viewing angle. Thus article 71 has a centrally disposed first or inner optically variable device 76 in the form of a circle seated within a circular hole 77 provided in the second or outer optically variable device 78 in the form of a square or rectangle. Similarly, the second paired optically variable device 72 consists of an inner or first optically variable structure 81 in the form of a circle which is disposed within a hole 82 provided in a second or outer variable device 83 in the form of a rectangle or square. The two articles 71 and 72 lie generally in the same plane and are disposed side by side in relatively close proximity to each other. The device 76 in the form of the circle in article 71 and the structure 83 in the form of a rectangle carry the same optically variable pigment and similarly, the device 78 and the device 81 of the device 71 and the article 72 respectively carry the same optically variable pigment.

Thus by way of example as shown below, the pigment carried by the devices 76 and 83 can carry a pigment which shifts from green to magenta and devices 78 and 81 can carry a pigment which shifts from green to blue. When the articles 71 and 72 are at one angle both articles 71 and 72 can have the same color of green whereas when the articles 71 and 72 are shifted at an angle, the devices will have two colors, magenta and blue with article 71 having a magenta center and a blue border and conversely the article 72 having a blue center and a magenta border.

In connection with the optically variable devices, it is possible to take batches of the optically variable pigments which may vary slightly in hue and blend the same to achieve the same color specification in production quantities. Also, color additive theory makes it possible to provide a multitude of additional colors if desired.

Also in accordance with the present invention in the event there is color metamerism at a certain color under a desired illuminant and if is desired to achieve an exact color match, this can be achieved by adding color used subtractively or additively to achieve an exact color.

Figure 18:
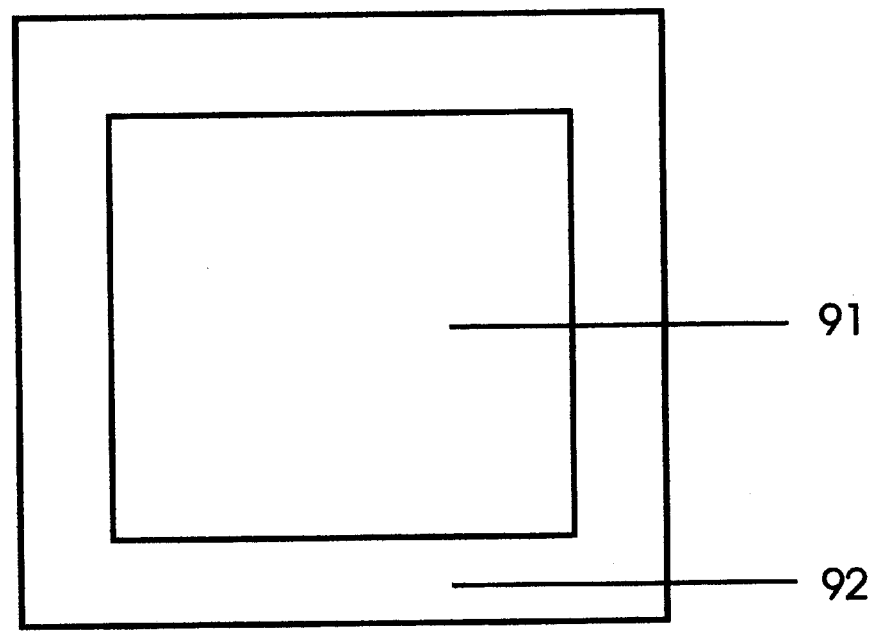
FIG. 18 is a plan view of a paired optically variable article incorporating the present invention in which a symbol is incorporated therein and is not visible to the human eye at a predetermined angle of incidence.
Figure 19:
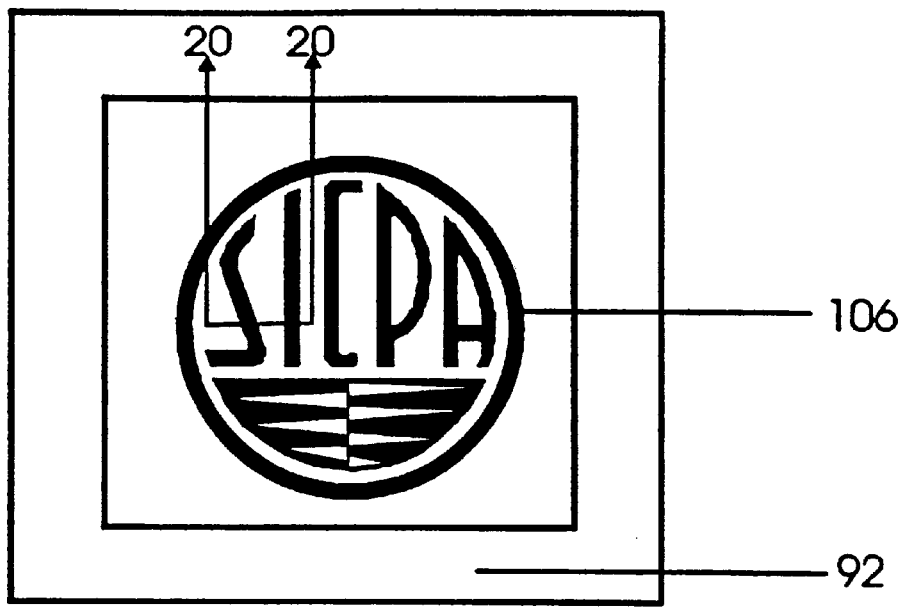
FIG. 19 is a plan view similar to FIG. 18 but viewed at a different angle of incidence which makes visible the "SICPA" symbol incorporated in the paired optically variable article.
Figure 20:
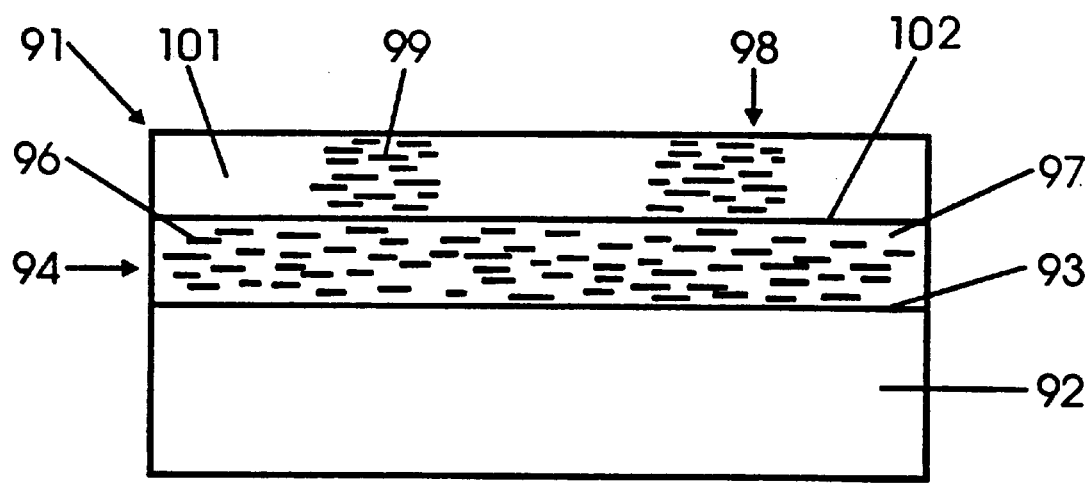
FIG. 20 is a cross-sectional view taken along the line 20—20 in FIG. 19.

In FIGS. 18, 19 and 20 there is disclosed another embodiment of a paired optically variable device 91 utilizing paired optically variable pigments incorporating the present invention. The optically variable device 91 is mounted on a substrate 92 of the type hereinbefore described having a surface 93. An optically variable device 94 having an optically variable pigment in the form of flakes 96 disposed in a solidified clear vehicle 97 is provided on the surface 93. Another optically variable device 98 which utilizes an optically variable pigment 99 is disposed in a clear solidified toner vehicle 101 is provided on surface 102 of the optically rariable structure 94 and provides a symbol or message which for example can be in the form of a logo 106. The symbol or logo 106 disappears at one angle of incidence with the optically variable pigments 96 and 99 having the same color as for example green so that the symbol is masked at normal incidence but appears when the device is tilted to a different angle to cause color shifts to occur as for example a color shift from green to blue with one pigment and green to magenta with the other pigment. Thus by way of example there would appear a green square at normal incidence and at an angle, the symbol 106 would appear in blue on a magenta background as depicted in FIG. 19.

The optically variable device 91 can be manufactured in a number of ways. For example the optically variable pigment 96 which in this example could be a green to magenta optically variable pigment 96 placed in the solidified liquid vehicle 97 on the surface 93. The symbol or logo 106 is then formed on the surface of the solidified liquid vehicle 97 by various means. It can be either printed onto the surface 102 or it can be imaged using a toner by means of electrophotography. In case of the electrophotographic process, a toner that may be clear or black can be provided in the form of an image or symbol. Once the toner image has been formed on the surface 102, the image is then dusted with the other optically variable pigment 99 of the pair. This dusting is known as a "bronzing technique". In accordance with the description above, the optically variable pigment 99 can be a green-to-blue shifter. In order to fuse the optically variable pigment 99 to the toner vehicle image, the device 91 is overlaid with a layer of flexible sheeting and passed through a heated laminator. This causes the toner to melt and to allow the overlying pigment 99 to become embedded in the toner vehicle 101. During the process of melting, the plan platelets align themselves parallel to the surface of the device, i.e., the surface 93. After passing through the laminator, the flexible sheeting is removed from the solidified toner image. No sticking of the toner to the flexible sheet occurs because the pigment is between the toner and the flexible sheet. Alternatively, the logo 106 could be printed using gravure, silk screen, intaglio or other printing methods.

Another embodiment of a paired optically variable article is shown in FIGS. 21, 22 and 23 in which the paired optical device 111 is provided on a substrate 112 which can be of a suitable type. It can be flexible or rigid and can be formed of cloth, paper, plastic and the like. The substrate 112 is provided with an upper surface 113 which has first and second optically variable devices 116 and 117 disposed thereon. The devices 116 and 117 are in the form of optically variable foils 118. The optically variable devices 116 and 117 are placed upon the surface 113 of the substrate 112 by first and second hot stamps (not shown) which are in registration into a dot matrix. As in the previous embodiments of the invention, the foils utilized in the devices 116 and 117 are of substantially the same color at the same angle of incidence and are of different colors at all other angles of incidence. Thus, as in the previous embodiments, one of the foils could shift from green to blue and the other one could shift from green to magenta so that at one angle, the optically variable foil in the devices 116 and 117 have the same color as for example green and at another angle the optically variable thin layer coatings in the devices 116 and 117 have two different colors, blue and magenta. In the dot matrix shown in FIGS. 21 and 22, the dots 116 utilized in the device 111 can be of a green-to-blue shifter whereas the dots 117 can be the green-to-magenta shifter. These foils can be made either by placing optically variable pigment flakes into a hot stamp polymer film carried by a release coat on a flexible substrate or by placing multilayer optically variable thin film coatings serving as optically variable specular foils carried by a release coat on a flexible substrate. Thus in the hot stamp matrix transfer shown in FIG. 21 at one angle, all of the dots have the same color whereas in FIG. 22 at a different angle, the pattern of the dots which make up the numeral 20 are formed of the green to magenta shifter so that when the angle of incidence is changed for the paired optically variable device 111 the dots on the substrate 112 will change from an all green color to a blue color for the background and to a magenta for the numeral 20 to provide a good contrast so that the numeral 20 can be readily seen by the human eye. With such an arrangement it can be seen that symbols, numerals and other devices such as a logos can be incorporated into the optically variable devices to aid in identification and also to provide anti-counterfeiting capabilities.

Although the embodiment shown in FIGS. 21, 22 and 23 has been disclosed as being a hot stamp transfer device, it should be appreciated that the same principles can be utilized in conjunction with a paint or an ink incorporating the optically variable pigments of the present invention.

From the foregoing, it can be seen that the paired optically variable articles of the present invention all utilize the same principal of having two interference designs having optically variable properties and that the paired optically variable designs have the same color at one angle of incidence and at all other angles have non-matching colors. Thus, in the case of pigments, it can be seen that even though it is difficult to even replicate one of the pigments with its color shift, to provide a pair of pigments in which the pair of pigments have the same matching color at the same angle would be much more difficult to replicate. Therefore the use of paired optically variable pigments contained in a printed image would make counterfeiting very difficult if not impossible. In accordance with the present invention it should be appreciated that these paired optically variable devices can also be paired with another pair of optically variable devices or paired with non-shifting pigment. Also, one interference optically variable devices can be paired with a non-shifting devices so that the non-shifting device matches the color of an optically variable device at a certain angle. Thus by example in FIGS. 21 and 22, the dot matrix can include a set of dots in registration having a pigment which is in the form of a non-shifting color which matches the color of a shifting pigment, as for example green, so that the composite would have an overall green color at one angle and at different angles there would be a number 20 in magenta against a green background.

In connection with the foregoing, it should be appreciated that the highest chroma and the greatest color change with angle has been found with the metal dielectric type designs rather than with an all dielectric designs having the same number of layers. This is because the metal dielectric designs involve selective color absorption in addition to interference. The devices display high chroma and hue changes with viewing angle while maintaining high luminance. The gamut of colors available to suppress counterfeiting is markedly increased by the use of paired optically variable devices in accordance with the present invention.

What is claimed is:

1. An optically variable article comprising a substrate having a first surface and first and second optical devices formed of layers carried by said first surface, at least one of the first and second optical devices being optically variable and forming a pair carried by the first surface of the substrate in spaced-apart positions without overlap on the first surface of the substrate to permit viewing at the same time by the human eye, said first and second optical devices having the same matching color at one angle of incidence between 0° and 90° for a color match angle and being without color match at all other angles of incidence.

2. An optically variable article as in claim 1 wherein at least one of the first and second optical devices includes a metal-dielectric interference stack.

3. An optically variable article as in claim 1 wherein at least one of the first and second optical devices includes an all dielectric interference stack.

4. An optically variable article as in claim 1 wherein said color match angle is a low angle of incidence between 0–10°.

5. An optically variable article as in claim 1 wherein said color match angle is a high angle of incidence of 30° and greater.

6. An optically variable article as in claim 1 wherein one of said first and second optical structures is non-shifting.

7. An optically variable article as in claim 1 further including a hot stamp polymer film and wherein the first and second optical devices are incorporated into the hot stamp polymer film to form a hot stamp foil.

8. An optically variable article as in claim 1 further including a non-shifting pigment carried by the substrate, said non-shifting pigment having the same color as the matching color of the first and second optical structures.

9. An optically variable article comprising a substrate having a first surface and first and second optical devices at least one of which is optically variable forming a pair carried by the first surface of the substrate in spaced-apart positions without overlap on the first surface of the substrate to permit viewing at the same time by the human eye, said first and second optical devices having the same matching color at one angle of incidence between 0° and 90° for a color match angle and being without color match at all other angles of incidence, said first and second optical devices being opaque.

10. An optically variable article as in claim 9 wherein each of said first and second opaque optical devices includes an opaque optically variable pigment.

11. An optically variable article as in claim 9 wherein each of said first and second opaque optical devices includes an opaque optically variable foil.

12. An optically variable article as in claim 9 wherein said first and second opaque optical devices are disposed in an ink vehicle to provide an ink.

13. An optically variable article as in claim 9 wherein said first and second opaque optical devices are disposed in a paint vehicle to provide a paint.

14. An optically variable article comprising a substrate having a first surface, a heat fusible toner carried by the first surface of the substrate, and first and second optical devices at least one of which is optically variable, said devices being carried by the heat fusible toner in spaced-apart positions without overlap on the toner and forming a pair that can be viewed at the same time by the human eye, said first and second optical devices having the same matching color at one angle of incidence between 0° and 90° for a color match angle and being without color match at all other angles of incidence.

15. An optically variable article comprising a substrate having a first surface, first and second optical devices at least one of which is optically variable forming a pair carried by the first surface of the substrate in spaced-apart positions without overlap on the first surface of the substrate to permit viewing at the same time by the human eye, said first and second optical devices having the same matching color at one angle of incidence between 0° and 90° for a color match angle and being without color match at all other angles of incidence, and third and fourth optical devices forming an additional pair carried by the first surface of the substrate in spaced-apart positions without overlap to permit viewing at the same time of the first named pair and the additional pair, said third and fourth optical devices having the same color at the color match angle as the first and second optical devices and having a different color or colors different from said same color at all other angles.

16. An optically variable article as in claim 15 together with an adhesive carried by the first surface of the substrate and a hot stamp polymer film disposed over the adhesive and wherein said first, second, third and fourth optical devices incorporate said hot stamp polymer film to provide first, second, third and fourth foils.

17. An optically variable article as in claim 15 wherein at least two of the first, second, third and fourth optical devices have the same different color at angles different from the color match angle.

18. An optically variable article comprising a substrate having a first surface, first and second optical devices at least one of which is optically variable forming a pair carried by the first surface of the substrate in spaced-apart positions without overlap on the first surface of the substrate to permit viewing at the same time by the human eye, said first and second optical devices having the same matching color at one angle of incidence between 0° and 90° for a color match angle and being without color match at all other angles of incidence, and third and fourth optical devices forming an additional pair carried by the first surface of the substrate in spaced-apart positions without overlap to permit viewing at the same time of the first named pair and the additional pair said third and fourth optical devices having a color match at an angle of incidence for an additional color match angle different from the color match angle for the first and second optical devices and being without color match at all other angles other than the additional color match angle.

19. An optically variable article comprising a substrate having a first surface and first and second opaque optical devices at least one of which is optically variable forming a pair carried by the first surface of the substrate in spaced-apart positions without overlap on the first surface of the substrate to permit viewing at the same time by the human eye, said first and second opaque optical devices having the same matching color at one angle of incidence between 0° and 90° for a color match angle and being without color match at all other angles of incidence, said first and second opaque optical devices having the same matching color with an illuminant at a temperature of 2856° Kelvin.

20. An optically variable article comprising a substrate having a first surface and first and second opaque optical devices at least one of which is optically variable forming a pair carried by the first surface of the substrate in spaced-apart positions without overlap on the first surface of the substrate to permit viewing at the same time by the human eye, said first and second opaque optical devices having the same matching color at one angle of incidence between 0° and 90° for a color match angle and being without color match at all other angles of incidence, said first and second opaque optical devices having the same matching color with an illuminant at 6770° Kelvin.

21. An optically variable article comprising a substrate having a first surface and first and second opaque optical devices at least one of which is optically variable forming a pair carried by the first surface of the substrate in spaced-apart positions without overlap on the first surface of the substrate to permit viewing at the same time by the human eye, said first and second opaque optical devices having the same matching color at one angle of incidence between 0° and 90° for a color match angle and being without color match at all other angles of incidence, said first and second opaque optical devices having the same matching color with an illuminant having a temperature of 4200° Kelvin.

22. An optically variable article comprising a substrate having a first surface, first and second opaque optical devices at least one of which is optically variable forming a pair carried by the first surface of the substrate in spaced-apart positions without overlap on the first surface of the substrate to permit viewing at the same time by the human eye, said first and second opaque optical devices having the same matching color at one angle of incidence between 0° an 90° for a color match angle and being without color match at all other angles of incidence, and a symbol, said symbol being formed by a predetermined arrangement of the first and second opaque optical devices.

23. An optically variable article as in claim 22 in which one of the first or second optical devices is in the form of a symbol and the other of the first and second optical devices is in the form of a background and in which the color of the symbol matches the color of the background at a given angle.

24. An optically variable article adapted to be viewed by the human eye comprising a substrate having a first surface, first and second optically variable devices carried by the first surface of the substrate in spaced-apart positions without overlap on the first surface of the substrate to permit viewing at the same time by the human eye, a first optically variable specular opaque foil disposed in the first optically variable device and a second optically variable specular opaque foil disposed in the second optically variable device, said optically variable specular opaque foils having the same color at one angle of incidence between 0° and 90° for a color match angle and being without color match at all other angles of incidence.

25. An optically variable article comprising a substrate having a first surface, first and second optical device carried by the first surface of the substrate in spaced-apart positions without overlap on the first surface of the substrate to permit viewing at the same time by the human eye, said first optical device being an optically variable structure and including a first optically variable opaque pigment, said second optical device including a non-shifting pigment, said first and second optical structures having the same color at one angle of incidence between 0° and 90° for a color match angle as the color of the non-shifting pigment and being without color match at all other angles of incidence.

26. An optically variable structure which is adapted to be used with another optically variable structure as a pair of optically variable structures in spaced-apart positions without overlap on a first surface of a substrate for viewing at the same time by the human eye, wherein said another optically variable structure being formed by a single optically variable opaque multilayer thin film interference stack exhibiting a color at one angle of incidence and different colors at all other angles of incidence, and wherein said optically variable structure comprising a single optically variable opaque multilayer thin film interference stack which is different from the optically variable opaque multilayer thin film interference stack of the another optically variable structure and which exhibits a color which is the same color of the another optically variable structure at the same angle of incidence between 0° and 90° for a color match angle but which is of different colors for all other angles of incidence.

27. A method for creating a paired colored reflectance for viewing at the same time by a human eye from a substrate having a surface with paired first and second optical structures thereon having colored pigments therein, the first optical structures having an optically variable pigment, forming the optically variable pigment so that it has one color at one angle of incidence that is the same color at the same angle of incidence as the color of the pigment in the second optical structure, illuminating the paired optical structures from a light source so that the paired optical structures reflect the same color at said one angle of incidence between 0° and 90° and reflect at least one different color at all other angles of incidence.

28. A method as in claim 27 together with the use of an additional paired first and second optical structures on the surface of the substrate which also can be viewed at the same time by the human eye as the first named paired optically variable structures, the method further including causing the additional paired first and second optical structures when illuminated from the same light source to reflect colors at said one angle which is the same as the color for the first named paired first and second optical structures at said one angle and different colors at other angles which are colors different from the different colors of the first named paired first and second optical structures.

29. A method as in claim 27 wherein said second optical structure has a non-shifting pigment, the method further including the step of providing a non-shifting pigment which is the same color when illuminated from the same light source as the color reflected by the first optical structure.

30. A method as in claim 27 further including the step of arranging the first and second optical structures to provide a symbol which is invisible at said one angle of incidence and which is visible at other angles of incidence.

* * * * *